US012757156B2

(12) United States Patent
Manolakos et al.

(10) Patent No.: US 12,757,156 B2
(45) Date of Patent: Oct. 6, 2026

(54) TIMING GROUP INDICATION FOR POSITIONING MEASUREMENT

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/006,348

(22) PCT Filed: Aug. 23, 2021

(86) PCT No.: PCT/US2021/047112
§ 371 (c)(1),
(2) Date: Jan. 20, 2023

(87) PCT Pub. No.: WO2022/055696
PCT Pub. Date: Mar. 17, 2022

(65) Prior Publication Data
US 2023/0292280 A1 Sep. 14, 2023

(30) Foreign Application Priority Data
Sep. 11, 2020 (IN) ............................. 202021039465

(51) Int. Cl.
*H04W 64/00* (2009.01)
*H04L 5/00* (2006.01)
*H04W 24/10* (2009.01)

(52) U.S. Cl.
CPC ......... *H04W 64/003* (2013.01); *H04L 5/0051* (2013.01); *H04W 24/10* (2013.01)

(58) Field of Classification Search
CPC ... H04W 64/003; H04W 24/10; H04W 64/00; H04W 72/23; H04W 24/02; H04W 24/08;
(Continued)

(56) References Cited

U.S. PATENT DOCUMENTS 6,486,831 B1 11/2002 Martorana et al.
6,747,594 B2 6/2004 Lindskog et al.
(Continued)

FOREIGN PATENT DOCUMENTS

CN 104166343 B 8/2017
CN 107734635 B 6/2021
(Continued)

OTHER PUBLICATIONS

Apple: "Signalling Impacts of RAN1 Agreements on Accuracy Enhancements", 3GPP TSG-RAN WG2 Meeting #116bis-e, R2-2201104, 3rd Generation Partnership Project, Mobile Competence Centre, 650, Route Des Lucioles, F-06921 Sophia-Antipolis Cedex, France, vol. RAN WG2, No. Electronic, Jan. 17, 2021-Jan. 25, 2021, Jan. 11, 2022, XP052094209, 5 pages, pp. 1-4.
(Continued)

*Primary Examiner* — Nimesh Patel
(74) *Attorney, Agent, or Firm* — Muncy, Geissler, Olds & Lowe, P.C./QUALCOMM Incorporated

(57) ABSTRACT

In an aspect, a wireless node (e.g., UE or BS) determines timing information associated with a first one or more reference signals for positioning or with a first one or more measurements derived using the first one or more reference signals for positioning, the first timing information including a transmit or receive hardware group delay, timing error, timing calibration error, or a combination thereof. The wireless node further determines that the first one or more reference signals or the first one or more measurements are associated with one of a plurality of timing groups at least
(Continued)

based on the first timing information. The wireless node transmits (e.g., to a position estimation entity) an indication of the associated timing group in association with the first one or more reference signals for positioning or with the first one or more measurements derived using the first one or more reference signals for positioning.

26 Claims, 16 Drawing Sheets

(58) Field of Classification Search
CPC ......... H04W 72/1268; H04W 72/0453; H04W 72/21; H04W 56/001; H04W 76/28; H04W 72/1273; H04W 76/15; H04W 72/20; H04W 72/046; H04W 84/042; H04W 48/12; H04W 74/006; H04W 16/28; H04W 48/18; H04W 88/08; H04W 72/542; H04W 8/24; H04W 88/085; H04W 72/12; H04W 72/56; H04W 12/06; H04W 4/02; H04W 52/245; H04W 56/005; H04W 72/53; H04W 4/029; H04W 88/02; H04W 28/086; H04W 28/0861; H04W 36/0088; H04W 56/00; H04W 36/0085; H04W 36/0061; H04W 28/02; H04W 36/00698; H04W 36/362; H04W 36/085; H04W 36/322; H04W 16/26; H04W 84/12; H04W 12/63; H04W 4/023; H04W 56/006; H04W 72/04; H04W 72/02; H04L 5/0051; H04L 5/0053; H04L 5/0048; H04L 5/0023; H04L 5/0055; H04L 5/0091; H04L 1/1854; H04L 5/0057; H04L 5/0016; H04L 5/0078; H04L 41/0894; H04L 5/006; H04L 12/1407; H04L 5/0005; H04L 5/0094; H04L 25/0224; H04L 27/2601; H04L 5/0007; H04L 5/0096; H04L 1/0054; H04L 23/02; H04L 1/0618; G01S 1/026; G01S 5/0036; G01S 5/021; G01S 5/0236; G01S 5/0205; G01S 5/0221; G01S 5/10; G01S 5/0009; G01S 5/06; G01S 5/02; G01S 5/0054; G01S 2205/008; G01S 19/396; G01S 5/0018; G01S 5/011; G01S 7/4865; G01S 7/497; G01S 1/045; G01S 5/0246; G01S 19/10; G01S 19/45; G01S 19/48; G01S 19/22; G01S 19/256; G01S 1/042; G01S 19/32; G01S 5/0226; G01S 19/42; G01S 5/0263; G01S 7/282; G01S 7/285; G01S 19/13; G01S 5/0027; G01S 5/0284; G01S 11/04; H04B 7/0695; H04B 7/088; H04B 7/0617; H04B 17/318; H04B 7/0626; H04B 17/345; H04B 17/336; H04B 7/0632; H04B 17/309; H04B 17/328; H04B 7/0413; H04B 17/252; H04B 17/27; G06N 20/00; G06N 3/063
See application file for complete search history.

(56) References Cited

U.S. PATENT DOCUMENTS

| | | | |
|---|---|---|---|
| 7,116,632 B2 | 10/2006 | Alapuranen | |
| 7,848,397 B2 | 12/2010 | Small | |
| 7,881,684 B2 | 2/2011 | Nakagawa et al. | |
| 9,020,495 B2 | 4/2015 | Kazmi et al. | |
| 9,380,546 B1 | 6/2016 | Smidth et al. | |
| 9,462,563 B2 | 10/2016 | Siomina et al. | |
| 9,648,573 B2 | 5/2017 | Siomina et al. | |
| 9,702,965 B2 | 7/2017 | Horvat et al. | |
| 10,218,471 B1 | 2/2019 | Kumar et al. | |
| 10,334,554 B2 | 6/2019 | Lee et al. | |
| 10,390,324 B2 | 8/2019 | Kazmi et al. | |
| 11,071,159 B1 | 7/2021 | Marupaduga | |
| 11,082,104 B2 | 8/2021 | Cai et al. | |
| 11,109,193 B2 | 8/2021 | Kim et al. | |
| 11,197,264 B2 | 12/2021 | Hunukumbure et al. | |
| 11,316,633 B2 | 4/2022 | Kim et al. | |
| 11,375,390 B2 | 6/2022 | Wu | |
| 11,510,174 B2 | 11/2022 | Cha et al. | |
| 12,289,704 B2 | 4/2025 | Cha et al. | |
| 2002/0070889 A1* | 6/2002 | Griffin | G01S 5/0009 342/353 |
| 2012/0007775 A1 | 1/2012 | Alizadeh-Shabdiz | |
| 2012/0188129 A1* | 7/2012 | Ameti | G01S 5/02213 342/451 |
| 2013/0162470 A1 | 6/2013 | Rousu et al. | |
| 2013/0185617 A1 | 7/2013 | Roh et al. | |
| 2014/0073351 A1* | 3/2014 | Loetter | G01S 5/02213 455/456.1 |
| 2014/0113674 A1 | 4/2014 | Joseph et al. | |
| 2015/0198696 A1 | 7/2015 | Liu | |
| 2015/0382152 A1* | 12/2015 | Lindskog | H04W 64/00 455/456.2 |
| 2016/0119039 A1 | 4/2016 | Soliman et al. | |
| 2016/0227516 A1 | 8/2016 | Nallampatti et al. | |
| 2016/0291128 A1 | 10/2016 | Persson et al. | |
| 2017/0164225 A1 | 6/2017 | Yu et al. | |
| 2017/0171714 A1 | 6/2017 | Cai | |
| 2017/0280288 A1 | 9/2017 | Do et al. | |
| 2018/0048345 A1 | 2/2018 | Pehlke et al. | |
| 2018/0063678 A1 | 3/2018 | Zhu et al. | |
| 2018/0146332 A1 | 5/2018 | Opshaug et al. | |
| 2018/0199224 A1* | 7/2018 | Li | H04W 24/10 |
| 2018/0226932 A1 | 8/2018 | Beaudin et al. | |
| 2019/0052996 A1 | 2/2019 | Sahai et al. | |
| 2019/0053013 A1 | 2/2019 | Markhovsky et al. | |
| 2019/0141554 A1 | 5/2019 | Siomina et al. | |
| 2019/0141555 A1 | 5/2019 | Tooher et al. | |
| 2019/0200320 A1* | 6/2019 | Selvaganapathy | H04W 64/003 |
| 2019/0223140 A1 | 7/2019 | Grossmann et al. | |
| 2019/0320403 A1 | 10/2019 | Zhang et al. | |
| 2020/0137607 A1 | 4/2020 | Akkarakaran et al. | |
| 2020/0137714 A1 | 4/2020 | Kumar et al. | |
| 2020/0145977 A1 | 5/2020 | Kumar et al. | |
| 2020/0178036 A1 | 6/2020 | Edge | |
| 2020/0205104 A1 | 6/2020 | Akkarakaran et al. | |
| 2020/0235877 A1 | 7/2020 | Manolakos et al. | |
| 2020/0259896 A1 | 8/2020 | Sachs et al. | |
| 2020/0267682 A1 | 8/2020 | Manolakos et al. | |
| 2020/0296680 A1 | 9/2020 | Akkarakaran et al. | |
| 2020/0314782 A1 | 10/2020 | Ruffini et al. | |
| 2020/0351814 A1 | 11/2020 | Manolakos et al. | |
| 2021/0014644 A1 | 1/2021 | Wu | |
| 2021/0058880 A1 | 2/2021 | Ghosh et al. | |
| 2021/0091905 A1 | 3/2021 | Si et al. | |
| 2021/0119746 A1 | 4/2021 | Manolakos et al. | |
| 2021/0120522 A1 | 4/2021 | Kim et al. | |
| 2021/0219254 A1 | 7/2021 | Wang et al. | |
| 2021/0235304 A1 | 7/2021 | Akkarakaran et al. | |
| 2021/0250892 A1 | 8/2021 | Kim | |
| 2021/0282111 A1 | 9/2021 | Yamada et al. | |
| 2021/0376940 A1 | 12/2021 | Huang et al. | |
| 2021/0377698 A1 | 12/2021 | Manolakos et al. | |
| 2021/0400755 A1 | 12/2021 | Van Der Velde et al. | |
| 2022/0038231 A1 | 2/2022 | Tao et al. | |
| 2022/0039052 A1 | 2/2022 | Choi et al. | |
| 2022/0053436 A1 | 2/2022 | Sosnin et al. | |
| 2022/0229146 A1 | 7/2022 | Ko et al. | |
| 2022/0232345 A1 | 7/2022 | Bao et al. | |
| 2022/0252690 A1 | 8/2022 | Zhou et al. | |
| 2022/0357420 A1 | 11/2022 | Zhou et al. | |
| 2022/0390546 A1 | 12/2022 | Cha et al. | |
| 2023/0176162 A1 | 6/2023 | Bhamri et al. | |
| 2023/0184871 A1 | 6/2023 | Ernström et al. | |
| 2023/0217403 A1 | 7/2023 | Koskela et al. | |
| 2023/0254808 A1 | 8/2023 | Manolakos et al. | |

(56) References Cited

U.S. PATENT DOCUMENTS

| | | | |
|---|---|---|---|
| 2023/0328567 | A1 | 10/2023 | Manolakos et al. |
| 2023/0388959 | A1 | 11/2023 | Hasegawa et al. |
| 2024/0007994 | A1 | 1/2024 | Si et al. |
| 2024/0012084 | A1 | 1/2024 | Lei et al. |
| 2024/0031934 | A1 | 1/2024 | Si et al. |
| 2024/0098544 | A1 | 3/2024 | Pan et al. |
| 2024/0183928 | A1 | 6/2024 | Ernstrom et al. |
| 2024/0236901 | A1 | 7/2024 | Yerramalli et al. |
| 2024/0314609 | A1 | 9/2024 | Manolakos et al. |
| 2025/0016722 | A1 | 1/2025 | Duan et al. |
| 2025/0081142 | A1 | 3/2025 | Hasegawa et al. |
| 2025/0184947 | A1 | 6/2025 | Cabrera Mercader et al. |

FOREIGN PATENT DOCUMENTS

| | | | |
|---|---|---|---|
| EP | 1158308 | A2 | 11/2001 |
| EP | 3177088 | B1 | 6/2020 |
| EP | 3911052 | A1 | 11/2021 |
| JP | 2019502115 | A | 1/2019 |
| JP | 2020005128 | A | 1/2020 |
| WO | WO-2017078610 | A1 | 5/2017 |
| WO | 2018206098 | A1 | 11/2018 |
| WO | 2019157052 | A1 | 8/2019 |
| WO | 2020038215 | A1 | 2/2020 |
| WO | 2020144624 | A1 | 7/2020 |
| WO | 2020167055 | A1 | 8/2020 |
| WO | 2020222956 | A1 | 11/2020 |
| WO | 2020229972 | A1 | 11/2020 |
| WO | 2020204600 | A3 | 12/2020 |
| WO | 2021063397 | A1 | 4/2021 |
| WO | 2021169676 | A1 | 9/2021 |
| WO | 2021187962 | A1 | 9/2021 |
| WO | 2022081630 | A1 | 4/2022 |
| WO | 2022258878 | A1 | 12/2022 |

OTHER PUBLICATIONS

Qualcomm Incorporated: "Open Issues in Core Requirements for NR Positioning—Rx/Tx Timing Error Mitigation", 3GPP TSG-RAN WG4 Meeting #103-e, R4-2208025, 3rd Generation Partnership Project, Mobile Competence Centre, 650, Route Des Lucioles, F-06921 Sophia-Antipolis Cedex, France, vol. RAN WG4, No. Online Meeting, May 9, 2022-May 20, 2022, Apr. 25, 2022, XP052143563, 6 pages, Section 2, pp. 1-3, Section 4, p. 5.

Vivo: "Discussion on Methods for Rx/Tx Timing Delay Mitigating", 3GPP TSG RAN WG1 #104b-e, R1-2102526, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, XP051993130, 15 Pages, Sections 1-6.

ZTE: "Evaluation Assumptions for NR Positioning Enhancements", R1-2005462, 3GPP TSG RAN WG1 Meeting #102-e, e-Meeting, Aug. 17-Aug. 28, 2020, pp. 1-4.

3GPP TR 22.804: "3rd Generation Partnership Project; Technical Specification Group Services and System Aspects; Study on Communication for Automation in Vertical Domains (Release 16)", 3GPP TR 22.804 V16.2.0 (Dec. 2018), https://www.3gpp.org/ftp//Specs/archive/22_series/22.804/22804-g20.zip, 196 Pages.

3GPP TS 37.355: "3rd Generation Partnership Project; Technical Specification Group Radio Access Network; LTE Positioning Protocol (LPP) (Release 16)", 3GPP TS 37.355, 3rd Generation Partnership Project, Mobile Competence Centre, 650, Route Des Lucioles, F-06921 Sophia-Antipolis Cedex, France, No. V16.1.0, Jul. 24, 2020 (Jul. 24, 2020), 292 pages, XP051925824, Chapters 4.1.3, 6.5.1.2, Sections 5-5.3.4 and 6.4.2-6.4.3, p. 13, paragraph 1 Scope—p. 104, paragraph 6.5.1.9 OTDOA Error Elements.

CATT [RAN1]: "[Draft] LS on UE/TRP Tx/Rx Timing Errors", 3GPP Draft, R1-2102201, 3GPP TSG RAN WG1 Meeting #104e, 3rd Generation Partnership Project (3GPP), Mobile Competence Centre, 650, Route Des Lucioles, F-06921, Sophia-Antipolis Cedex, France, vol. RAN WG1, No. e-meeting, Jan. 25, 2021-Feb. 5, 2021, Feb. 8, 2021 (Feb. 8, 2021), XP051977763, 2 Pages.

Ericsson: "PRS Configuration Identity Feedback for OTDOA Enhancements", 3GPP Draft, 3GPP TSG-RAN1 Meeting #97bis, R1-1705942—PRS Configuration Identity Feedback for OTDOA Enhancements, 3rd Generation Partnership Project (3GPP), Mobile Competence Centre, 650, Route Des Lucioles, F-06921 Sophia-Anti, vol. RAN WG1, No. Spokane, US, Apr. 3, 2017-Apr. 7, 2017, Apr. 2, 2017 (Apr. 2, 2017), XP051244051, pp. 1-3, Sections 1, 2.

Ericsson: "Techniques Mitigating UE Rx/Tx Timing Delays", 3GPP Draft, R1-2101754, 3GPP TSG-RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971905, pp. 1-22.

Intel Corporation: "Mitigation of UE/gNB TX/RX Timing Errors", 3GPP TSG RAN WG1 #105e, R1-2104905, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 8 Pages, XP052011123.

Qualcomm Incorporated: "Discussion on Positioning Enhancements UE Features", R1-2112250, 3GPP TSG RAN WG1 #107-e, 3rd Generation Partnership Project (3GPP), Mobile Competence Centre, 650, Route Des Lucioles, F-06921, Sophia-Antipolis Cedex, France, vol. RAN WG1, No. e-Meeting, Nov. 11, 2021-Nov. 19, 2021, Nov. 6, 2021 (Nov. 6, 2021), XP052075355, pp. 1-19.

Qualcomm Incorporated: "Enhancements on Timing Error Mitigations for Improved Accuracy", 3GPP TSG RAN WG1 #104-e, R1-2101468, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-12, Jan. 19, 2021, XP051971633, Section 3.2 "Double Differential Positioning Methods—Elimination of both UE's and gNB unknow GDs", see also figure on p. 7, p. 6-9.

Qualcomm Incorporated: "Initial Evaluation of Achievable Positioning Accuracy", 3GPP Draft, 3GPP TSG RAN WG1 #101-e, R1-2004491, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886220, 21 Pages, Section 3.

Qualcomm Incorporated: "Enhancements on Timing Error Mitigations for Improved Accuracy", 3GPP TSG RAN WG1 #104b-e, R1-2104671, 3rd Generation Partnership Project, Mobile Competence Centre, 650, Route Des Lucioles, F-06921, Sophia-Antipolis Cedex, France, vol. RAN WG1, No. e-Meeting, May 10, 2021-May 27, 2021, May 12, 2021, XP052010922, 22 Pages, Chapter 4 Reference Devices for Measurement Calibration, p. 13, paragraph 5-p. 17, paragraph 5.

Qualcomm Incorporated: "Potential Enhancements for NR Rel-17 Positioning", 3GPP TSG RAN WG1 #102-e, 3GPP Draft, R1-2006810, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 20200-Aug. 28, 2020, Aug. 8, 2020 (Aug. 8, 2020), pp. 1-21, XP051918260, Proposal 11, paragraph [03.3] paragraph [4.2.2], p. 11.

Qualcomm Incorporated: "Potential Positioning Enhancements for NR Rel-17 Positioning", 3GPP TSG RAN WG1 #103-e, R1-2008619, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, XP051940245, 17 Pages, Section 3.2 Frequency-domain DL/UL PRS bundling, paragraph [05.4], p. 16.

Qualcomm Incorporated: "Remaining Details on UE & gNB Measurements for NR Positioning", 3GPP Draft, R1-1912975, 3GPP TSG RAN WG1 #98, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Nov. 9, 2019 (Nov. 9, 2019), XP051823737, pp. 1-12, p. 1-p. 12, p. 2, p. 8, p. 10.

Qualcomm Incorporated: "Remaining Issues on Timing Error Mitigations for Improved Accuracy", 3GPP TSG RAN WG1 #106-bis-e,

(56) References Cited

OTHER PUBLICATIONS

R1-2110187, 3rd Generation Partnership Project, Mobile Competence Centre, 650, Route Des Lucioles, F-06921, Sophia-Antipolis Cedex, France, vol. RAN WG1, No. e-Meeting, Oct. 11, 2021-Oct. 19, 2021, Oct. 2, 2021, 10 Pages, XP052059123, The whole document.

Samsung: "DL and UL Reference Signals Design for NR Positioning", 3GPP Draft, 3GPP TSG RAN WG1 #96b, R1-1904394 NR Positioning DL and UL RS Design_SS, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 2, 2019 (Apr. 2, 2019), XP051707199, pp. 1-15, Sections 2, 3, 4, Abstract, Section 2.2.2, 2.4.

Sivers M., et al., "LTE Positioning Accuracy Performance Evaluation", Internet of Things, Smart Spaces, and Next Generation Networks and Systems, ruSMART 2015, NEW2AN 2015, Lecture Notes in Computer Science, vol. 9247. Springer, Cham, https://doi.org/10.1007/978-3-319-23126-6_35, 14 Pages.

Spreadtrum Communications: "Discussion on DL only Based Positioning", 3GPP Draft, 3GPP TSG RAN WG1 Meeting #96, R1-1902721 Discussion on DL only Based Positioning, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600416, 5 Pages, Sections 1 and 2.

International Search Report and Written Opinion—PCT/US2021/047112—ISA/EPO—Jan. 5, 2022.

3GPP TS 37.355: "3rd Generation Partnership Project, Technical Specification Group Radio Access Network, LTE Positioning Protocol (LPP)(Release 16)", 3GPP TS 37.355 V16.3.0, Dec. 2020, pp. 1-295.

Qualcomm Incorporated: "Initial Evaluation of Achievable Positioning Accuracy", 3GPP TSG RAN WG1 #101-e, R1-2004491, e-meeting, May 25-Jun. 5, 2020, pp. 1-21, May 16, 2020.

Qualcomm Incorporated: "Potential Positioning Enhancements for NR Rel-17 Positioning", 3GPP TSG RAN WG1 #103-e, R1-2008619, e-Meeting, Oct. 26-Nov. 13, 2020, 17 Pages, Nov. 1, 2020.

* cited by examiner

TIMING GROUP INDICATION FOR POSITIONING MEASUREMENT

CROSS-REFERENCE TO RELATED APPLICATIONS

The present Application for Patent claims the benefit of International Application No. PCT/US2021/047112, entitled "TIMING GROUP INDICATION FOR POSITIONING MEASUREMENT," filed Aug. 23, 2021, and Indian Patent Application No. 202021039465, entitled "TIMING GROUP INDICATION FOR POSITIONING MEASUREMENT," filed Sep. 11, 2020, both of which are assigned to the assignee hereof and expressly incorporated herein by reference in their entirety.

BACKGROUND OF THE DISCLOSURE

1. Field of the Disclosure

Aspects of the disclosure relate generally to wireless communications, and more particularly to a timing group indication for positioning measurement.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless node includes determining first timing information associated with a first one or more reference signals for positioning or with a first one or more measurements derived using the first one or more reference signals for positioning, the first timing information including a transmit or receive hardware group delay, timing error, timing calibration error, or a combination thereof; determining that the first one or more reference signals or the first one or more measurements are associated with one of a plurality of timing groups at least based on the first timing information; and transmitting an indication of the associated timing group in association with the first one or more reference signals for positioning or with the first one or more measurements derived using the first one or more reference signals for positioning.

In some aspects, the first timing information is associated with a set of hardware components of the first wireless node.

In some aspects, the method includes determining second timing information associated with a second one or more reference signals for positioning or with a second one or more measurements derived using the second one or more reference signals for positioning, the second timing information being different than the first timing information; and determining that the second one or more reference signals or the second one or more measurements are associated with the same timing group as the first one or more reference signals or the first one or more measurements based on the first timing information and the second timing information falling within a respective timing information range.

In some aspects, the method includes determining second timing information associated with a second one or more reference signals for positioning or with a second one or more measurements derived using the second one or more reference signals for positioning, the second timing information being the same as the first timing information; and determining that the second one or more reference signals or the second one or more measurements are associated with the same timing group as the first one or more reference signals or the first one or more measurements based on the first timing information and the second timing information being the same.

In some aspects, the first timing information matches respective timing information of the associated timing group by corresponding to a particular transmit or receive hardware group delay, a particular timing error, a particular timing calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the method includes performing the first one or more measurements associated with the first one or more reference signals for positioning; and transmitting a measurement report based on the first one or more measurements.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, the indication of the associated timing group comprises a respective indication of a respective timing group associated with each measurement in the measurement report.

In some aspects, multiple measurements associated with the same receive beam index are also associated with the same timing group.

In some aspects, the measurement report comprises a single-bit indication that indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the method includes transmitting the one or more Tx reference signals for positioning.

In some aspects, the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the method includes performing the first one or more measurements in association with the Rx reference signal for positioning and the Tx reference signal for positioning; and transmitting a measurement report based on the first one or more measurements.

In some aspects, the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

In some aspects, the wireless node corresponds to a user equipment (UE), further comprising: transmitting a measurement report associated with the first one or more reference signals.

In some aspects, the indication is integrated with the measurement report or separate from the measurement report.

In some aspects, the indication is transmitted in a time-based or event-based manner.

In some aspects, the first one or more reference signals for positioning comprise a first reference signal for positioning and a second reference signal for positioning associated with a differential positioning measurement, and the transmitting transmits a first indication of a first timing group associated with the first reference signal for positioning and a second indication of a second timing group associated with the second reference signal for positioning.

In some aspects, the plurality of timing groups is associated with a respective maximum timing offset that specifies a maximum timing offset to be assumed by a network component for each respective timing group.

In some aspects, the method includes updating the maximum timing offsets on a periodic basis, an event-triggered basis, or a combination thereof; and reporting the maximum timing offsets to the network component.

In some aspects, the reporting further comprises reporting one or more timer validity tags that each indicates or is associated with a validity time for one or more parameters associated with the indication of the associated timing group.

In an aspect, a method of operating a position estimation entity includes receiving, from a first wireless node or a second wireless node, a first one or more measurements associated with a first one or more reference signals for positioning communicated between the first wireless node and the second wireless node; receiving, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and performing a positioning estimation procedure based at least in part upon the first one or more measurements and the first timing information associated with the associated timing group.

In some aspects, the first timing information is associated with a set of hardware components of the first wireless node.

In some aspects, the method includes receiving, from the first wireless node, a second one or more measurements associated with a second one or more reference signals for positioning; and receiving, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

In some aspects, the method includes receiving, from the first wireless node, a second one or more measurements associated with a second one or more reference signals for positioning; and receiving, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

In some aspects, the positioning estimation procedure is performed with respect to a user equipment (UE) that corresponds to either the first wireless node or the second wireless node.

In some aspects, the first timing information matches respective timing information of the associated timing group by corresponding to a particular transmit or receive hardware group delay, a particular timing error, a particular calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the first wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the first one or more measurements are received in a measurement report.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, a respective indication of a respective timing group associated with each of the first one or more measurements is received.

In some aspects, multiple measurements associated with the same receive beam index are also associated with the same timing group.

In some aspects, a single-bit indication indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning that are transmitted from the first wireless node.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

In some aspects, the indication is integrated with a measurement report comprising the first one or more measurements or separate from the measurement report.

In some aspects, the indication is received in a time-based or event-based manner.

In some aspects, the first one or more reference signals for positioning comprise a first reference signal for positioning and a second reference signal for positioning associated with a differential positioning measurement, and a first indication of a first timing group associated with the first reference signal for positioning is received and a second indication of a second timing group associated with the second reference signal for positioning is received.

In some aspects, the plurality of timing groups is associated with a respective maximum timing offset that specifies a maximum timing offset to be assumed for positioning estimation by the position estimation entity for each respective timing group.

In some aspects, the method includes receiving a report that indicates an update to the maximum timing offsets on a periodic basis, an event-triggered basis, or a combination thereof.

In some aspects, the report further indicates one or more timer validity tags that each indicates or is associated with a validity time for one or more parameters associated with the indication of the associated timing group.

In an aspect, a wireless node includes a memory; at least one transceiver; and at least one processor communicatively coupled to the memory and the at least one transceiver, the at least one processor configured to: determine first timing information associated with a first one or more reference signals for positioning or with a first one or more measurements derived using the first one or more reference signals for positioning, the first timing information including a transmit or receive hardware group delay, timing error, timing calibration error, or a combination thereof; determine that the first one or more reference signals or the first one or more measurements are associated with one of a plurality of timing groups at least based on the first timing information; and transmit, via the at least one transceiver, an indication of the associated timing group in association with the first one or more reference signals for positioning or with the first one or more measurements derived using the first one or more reference signals for positioning.

In some aspects, the first timing information is associated with a set of hardware components of the first wireless node.

In some aspects, the at least one processor is further configured to: determine second timing information associated with a second one or more reference signals for positioning or with a second one or more measurements derived using the second one or more reference signals for positioning, the second timing information being different than the first timing information; and determine that the second one or more reference signals or the second one or more measurements are associated with the same timing group as the first one or more reference signals or the first one or more measurements based on the first timing information and the second timing information falling within a respective timing information range.

In some aspects, the at least one processor is further configured to: determine second timing information associated with a second one or more reference signals for positioning or with a second one or more measurements derived using the second one or more reference signals for positioning, the second timing information being the same as the first timing information; and determine that the second one or more reference signals or the second one or more measurements are associated with the same timing group as the first one or more reference signals or the first one or more measurements based on the first timing information and the second timing information being the same.

In some aspects, the first timing information matches respective timing information of the associated timing group by corresponding to a particular transmit or receive hardware group delay, a particular timing error, a particular timing calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the at least one processor is further configured to: perform the first one or more measurements associated with the first one or more reference signals for positioning; and transmit, via the at least one transceiver, a measurement report based on the first one or more measurements.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, the indication of the associated timing group comprises a respective indication of a respective timing group associated with each measurement in the measurement report.

In some aspects, multiple measurements associated with the same receive beam index are also associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the at least one processor is further configured to: transmit, via the at least one transceiver, the one or more Tx reference signals for positioning.

In some aspects, the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the at least one processor is further configured to: perform the first one or more measurements in association with the Rx reference signal for positioning and the Tx reference signal for positioning; and transmit, via the at least one transceiver, a measurement report based on the first one or more measurements.

In some aspects, the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

In some aspects, the wireless node corresponds to a user equipment (UE), further comprising: transmit, via the at least one transceiver, a measurement report associated with the first one or more reference signals.

In some aspects, the indication is integrated with the measurement report or separate from the measurement report.

In some aspects, the indication is transmitted in a time-based or event-based manner.

In some aspects, the first one or more reference signals for positioning comprise a first reference signal for positioning and a second reference signal for positioning associated with a differential positioning measurement, and the transmitting transmits a first indication of a first timing group associated with the first reference signal for positioning and a second indication of a second timing group associated with the second reference signal for positioning.

In some aspects, the plurality of timing groups is associated with a respective maximum timing offset that specifies a maximum timing offset to be assumed by a network component for each respective timing group.

In some aspects, the at least one processor is further configured to: update the maximum timing offsets on a periodic basis, an event-triggered basis, or a combination thereof; and report the maximum timing offsets to the network component.

In some aspects, the reporting further comprises reporting one or more timer validity tags that each indicates or is associated with a validity time for one or more parameters associated with the indication of the associated timing group.

In an aspect, a position estimation entity includes a memory; at least one transceiver; and at least one processor communicatively coupled to the memory and the at least one transceiver, the at least one processor configured to: receive, via the at least one transceiver, from a first wireless node or a second wireless node, a first one or more measurements associated with a first one or more reference signals for positioning communicated between the first wireless node and the second wireless node; receive, via the at least one transceiver, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and perform a positioning estimation procedure based at least in part upon the first one or more measurements and the first timing information associated with the associated timing group.

In some aspects, the first timing information is associated with a set of hardware components of the first wireless node.

In some aspects, the at least one processor is further configured to: receive, via the at least one transceiver, from the first wireless node, a second one or more measurements associated with a second one or more reference signals for positioning; and receive, via the at least one transceiver, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

In some aspects, the at least one processor is further configured to: receive, via the at least one transceiver, from the first wireless node, a second one or more measurements associated with a second one or more reference signals for positioning; and receive, via the at least one transceiver, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

In some aspects, the positioning estimation procedure is performed with respect to a user equipment (UE) that corresponds to either the first wireless node or the second wireless node.

In some aspects, the first timing information matches respective timing information of the associated timing group by corresponding to a particular transmit or receive hardware group delay, a particular timing error, a particular calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the first wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the first one or more measurements are received in a measurement report.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, a respective indication of a respective timing group associated with each of the first one or more measurements is received.

In some aspects, multiple measurements associated with the same receive beam index are also associated with the same timing group.

In some aspects, a single-bit indication indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning that are transmitted from the first wireless node.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

In some aspects, the indication is integrated with a measurement report comprising the first one or more measurements or separate from the measurement report.

In some aspects, the indication is received in a time-based or event-based manner.

In some aspects, the first one or more reference signals for positioning comprise a first reference signal for positioning and a second reference signal for positioning associated with a differential positioning measurement, and a first indication of a first timing group associated with the first reference signal for positioning is received and a second indication of a second timing group associated with the second reference signal for positioning is received.

In some aspects, the plurality of timing groups is associated with a respective maximum timing offset that specifies a maximum timing offset to be assumed for positioning estimation by the position estimation entity for each respective timing group.

In some aspects, the method includes receiving a report that indicates an update to the maximum timing offsets on a periodic basis, an event-triggered basis, or a combination thereof.

In some aspects, the report further indicates one or more timer validity tags that each indicates or is associated with a validity time for one or more parameters associated with the indication of the associated timing group.

In an aspect, a wireless node includes means for determining first timing information associated with a first one or more reference signals for positioning or with a first one or more measurements derived using the first one or more reference signals for positioning, the first timing information including a transmit or receive hardware group delay, timing error, timing calibration error, or a combination thereof; means for determining that the first one or more reference signals or the first one or more measurements are associated with one of a plurality of timing groups at least based on the first timing information; and means for transmitting an indication of the associated timing group in association with the first one or more reference signals for positioning or with the first one or more measurements derived using the first one or more reference signals for positioning.

In some aspects, the first timing information is associated with a set of hardware components of the first wireless node.

In some aspects, the method includes means for determining second timing information associated with a second one or more reference signals for positioning or with a second one or more measurements derived using the second one or more reference signals for positioning, the second timing information being different than the first timing information; and means for determining that the second one or more reference signals or the second one or more measurements are associated with the same timing group as the first one or more reference signals or the first one or more measurements based on the first timing information and the second timing information falling within a respective timing information range.

In some aspects, the method includes means for determining second timing information associated with a second one or more reference signals for positioning or with a second one or more measurements derived using the second one or more reference signals for positioning, the second timing information being the same as the first timing information; and means for determining that the second one or more reference signals or the second one or more measurements are associated with the same timing group as the first one or more reference signals or the first one or more measurements based on the first timing information and the second timing information being the same.

In some aspects, the first timing information matches respective timing information of the associated timing group by corresponding to a particular transmit or receive hardware group delay, a particular timing error, a particular timing calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the method includes means for performing the first one or more measurements associated with the first one or more reference signals for positioning; and means for transmitting a measurement report based on the first one or more measurements.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, the indication of the associated timing group comprises a respective indication of a respective timing group associated with each measurement in the measurement report.

In some aspects, multiple measurements associated with the same receive beam index are also associated with the same timing group.

In some aspects, the measurement report comprises a single-bit indication that indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the method includes means for transmitting the one or more Tx reference signals for positioning.

In some aspects, the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the method includes means for performing the first one or more measurements in association with the Rx reference signal for positioning and the Tx reference signal for positioning; and means for transmitting a measurement report based on the first one or more measurements.

In some aspects, the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

In some aspects, the wireless node corresponds to a user equipment (UE), further comprising: means for transmitting a measurement report associated with the first one or more reference signals.

In some aspects, the indication is integrated with the measurement report or separate from the measurement report.

In some aspects, the indication is transmitted in a time-based or event-based manner.

In some aspects, the first one or more reference signals for positioning comprise a first reference signal for positioning and a second reference signal for positioning associated with a differential positioning measurement, and the transmitting transmits a first indication of a first timing group associated with the first reference signal for positioning and a second indication of a second timing group associated with the second reference signal for positioning.

In some aspects, the plurality of timing groups is associated with a respective maximum timing offset that specifies a maximum timing offset to be assumed by a network component for each respective timing group.

In some aspects, the method includes means for updating the maximum timing offsets on a periodic basis, an event-triggered basis, or a combination thereof; and means for reporting the maximum timing offsets to the network component.

In some aspects, the reporting further comprises reporting one or more timer validity tags that each indicates or is associated with a validity time for one or more parameters associated with the indication of the associated timing group.

In an aspect, wherein the first Rx reference signal for positioning is a quasi-colocation (QCL) source or target or a spatial relation reference for the second Rx reference signal for positioning.

In an aspect, a position estimation entity includes means for receiving, from a first wireless node or a second wireless node, a first one or more measurements associated with a first one or more reference signals for positioning communicated between the first wireless node and the second wireless node; means for receiving, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and means for performing a positioning estimation procedure based at least in part upon the first one or more measurements and the first timing information associated with the associated timing group.

In some aspects, the first timing information is associated with a set of hardware components of the first wireless node.

In some aspects, the method includes means for receiving, from the first wireless node, a second one or more measurements associated with a second one or more reference signals for positioning; and means for receiving, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

In some aspects, the method includes means for receiving, from the first wireless node, a second one or more measurements associated with a second one or more reference signals for positioning; and means for receiving, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

In some aspects, the positioning estimation procedure is performed with respect to a user equipment (UE) that corresponds to either the first wireless node or the second wireless node.

In some aspects, the first timing information matches respective timing information of the associated timing group by corresponding to a particular transmit or receive hardware group delay, a particular timing error, a particular calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the first wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the first one or more measurements are received in a measurement report.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, a respective indication of a respective timing group associated with each of the first one or more measurements is received.

In some aspects, multiple measurements associated with the same receive beam index are also associated with the same timing group.

In some aspects, a single-bit indication indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning that are transmitted from the first wireless node.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

In some aspects, the indication is integrated with a measurement report comprising the first one or more measurements or separate from the measurement report.

In some aspects, the indication is received in a time-based or event-based manner.

In some aspects, the first one or more reference signals for positioning comprise a first reference signal for positioning and a second reference signal for positioning associated with a differential positioning measurement, and a first indication of a first timing group associated with the first reference signal for positioning is received and a second indication of a second timing group associated with the second reference signal for positioning is received.

In some aspects, the plurality of timing groups is associated with a respective maximum timing offset that specifies a maximum timing offset to be assumed for positioning estimation by the position estimation entity for each respective timing group.

In some aspects, the at least one processor is further configured to receive a report that indicates an update to the maximum timing offsets on a periodic basis, an event-triggered basis, or a combination thereof.

In some aspects, the report further indicates one or more timer validity tags that each indicates or is associated with a validity time for one or more parameters associated with the indication of the associated timing group.

In an aspect, a non-transitory computer-readable medium storing computer-executable instructions that, when executed by a wireless node, cause the wireless node to:

determine first timing information associated with a first one or more reference signals for positioning or with a first one or more measurements derived using the first one or more reference signals for positioning, the first timing information including a transmit or receive hardware group delay, timing error, timing calibration error, or a combination thereof; determine that the first one or more reference signals or the first one or more measurements are associated with one of a plurality of timing groups at least based on the first timing information; and transmit an indication of the associated timing group in association with the first one or more reference signals for positioning or with the first one or more measurements derived using the first one or more reference signals for positioning.

In some aspects, the first timing information is associated with a set of hardware components of the first wireless node.

In some aspects, the first timing information matches respective timing information of the associated timing group by corresponding to a particular transmit or receive hardware group delay, a particular timing error, a particular timing calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, the indication of the associated timing group comprises a respective indication of a respective timing group associated with each measurement in the measurement report.

In some aspects, multiple measurements associated with the same receive beam index are also associated with the same timing group.

In some aspects, the measurement report comprises single-bit indication that indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

In some aspects, the wireless node corresponds to a user equipment (UE), further comprising: transmit a measurement report associated with the first one or more reference signals.

In some aspects, the indication is integrated with the measurement report or separate from the measurement report.

In some aspects, the indication is transmitted in a time-based or event-based manner.

In some aspects, the first one or more reference signals for positioning comprise a first reference signal for positioning and a second reference signal for positioning associated with a differential positioning measurement, and the transmitting transmits a first indication of a first timing group associated with the first reference signal for positioning and a second indication of a second timing group associated with the second reference signal for positioning.

In some aspects, the plurality of timing groups is associated with a respective maximum timing offset that specifies a maximum timing offset to be assumed by a network component for each respective timing group.

In some aspects, the reporting further comprises reporting one or more timer validity tags that each indicates or is associated with a validity time for one or more parameters associated with the indication of the associated timing group.

In an aspect, a non-transitory computer-readable medium storing computer-executable instructions that, when executed by a position estimation entity, cause the position estimation entity to: receive, from a first wireless node or a second wireless node, a first one or more measurements associated with a first one or more reference signals for positioning communicated between the first wireless node and the second wireless node; receive, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and perform a positioning estimation procedure based at least in part upon the first one or more measurements and the first timing information associated with the associated timing group.

In some aspects, the first timing information is associated with a set of hardware components of the first wireless node.

In some aspects, the positioning estimation procedure is performed with respect to a user equipment (UE) that corresponds to either the first wireless node or the second wireless node.

In some aspects, the first timing information matches respective timing information of the associated timing group by corresponding to a particular transmit or receive hardware group delay, a particular timing error, a particular calibration error, or a combination thereof, or the first timing information matches the respective timing information of the associated timing group by falling within a transmit or receive hardware group delay range, a timing error range, a timing calibration error range, or a combination thereof.

In some aspects, the first one or more reference signals for positioning include one or more receive (Rx) reference signals for positioning received at the first wireless node.

In some aspects, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

In some aspects, the one or more Rx reference signals for positioning comprise a first Rx reference signal for positioning and a second Rx reference signal for positioning, configured in different frequency layers or different bands or different Frequency Ranges (FRs) are associated with the same timing group.

In some aspects, the first Rx reference signal for positioning is a quasi-colocation (QCL) source or target or a spatial relation reference for the second Rx reference signal for positioning.

In some aspects, the first one or more measurements are received in a measurement report.

In some aspects, the first one or more measurements comprise one or more timing measurements.

In some aspects, the one or more timing measurements comprise a time of arrival (ToA) measurement, a received signal time difference (RSTD) measurement, or an receive-transmit (Rx-Tx) measurement.

In some aspects, a respective indication of a respective timing group associated with each of the first one or more measurements is received.

In some aspects, multiple measurements associated with the same receive beam index are also associated with the same timing group.

In some aspects, a single-bit indication indicates whether all measurements in the measurement report are associated with the same timing group.

In some aspects, the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

In some aspects, the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

In some aspects, the first one or more reference signals include one or more transmit (Tx) reference signals for positioning that are transmitted from the first wireless node.

In some aspects, the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

In some aspects, the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

In some aspects, the first one or more reference signals include a receive (Rx) reference signal for positioning and a transmit (Tx) reference signal for positioning.

In some aspects, the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

In some aspects, the indication is integrated with a measurement report comprising the first one or more measurements or separate from the measurement report.

In some aspects, the indication is received in a time-based or event-based manner.

In some aspects, the first one or more reference signals for positioning comprise a first reference signal for positioning and a second reference signal for positioning associated with a differential positioning measurement, and a first indication of a first timing group associated with the first reference signal for positioning is received and a second indication of a second timing group associated with the second reference signal for positioning is received.

In some aspects, the plurality of timing groups is associated with a respective maximum timing offset that specifies a maximum timing offset to be assumed for positioning estimation by the position estimation entity for each respective timing group.

In some aspects, the report further indicates one or more timer validity tags that each indicates or is associated with a validity time for one or more parameters associated with the indication of the associated timing group.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
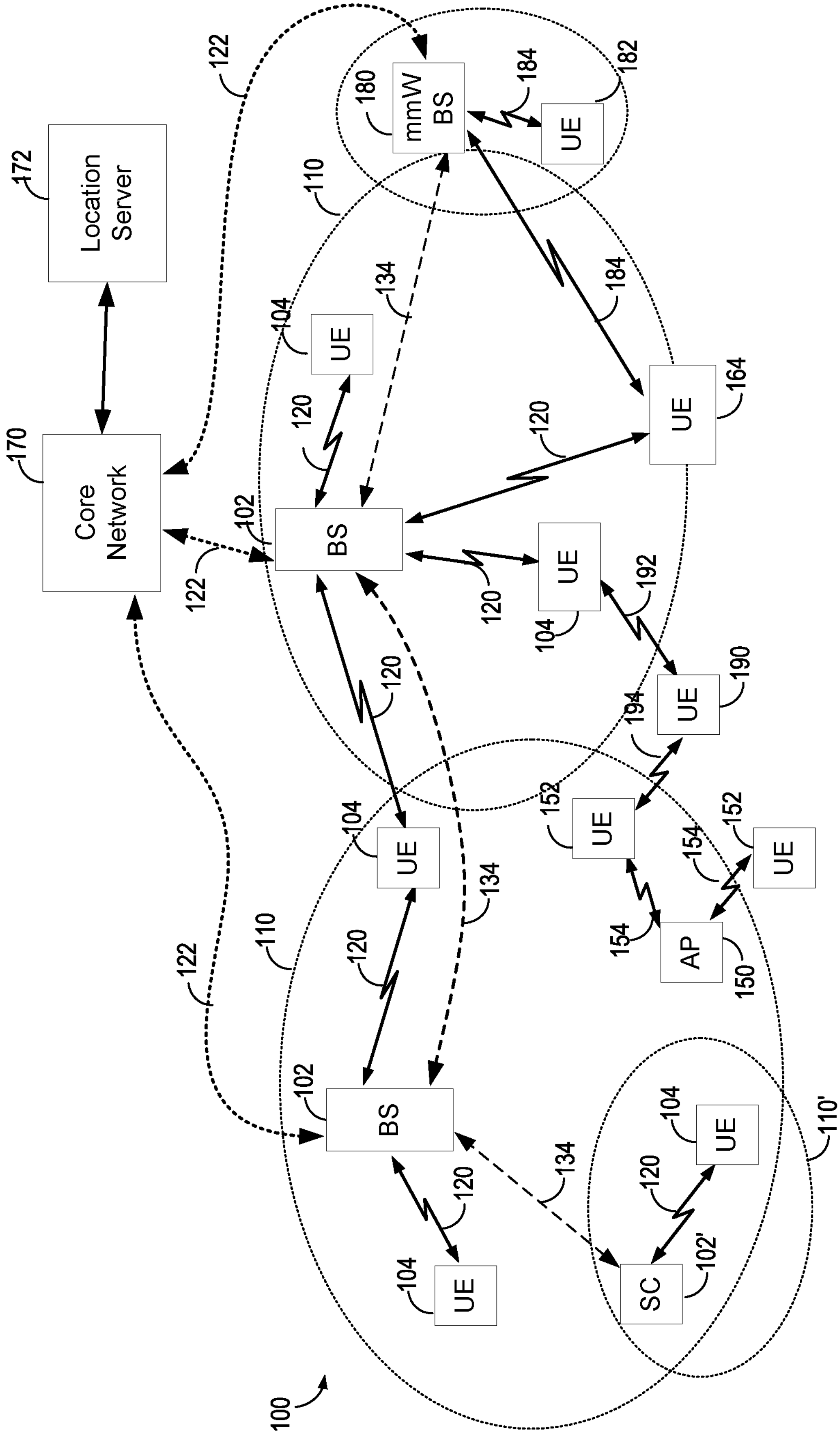
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words “exemplary” and/or “example” are used herein to mean “serving as an example, instance, or illustration.”

Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. In some systems, a base station may correspond to a Customer Premise Equipment (CPE) or a road-side unit (RSU). In some designs, a base station may correspond to a high-powered UE (e.g., a vehicle UE or VUE) that may provide limited certain infrastructure functionality. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
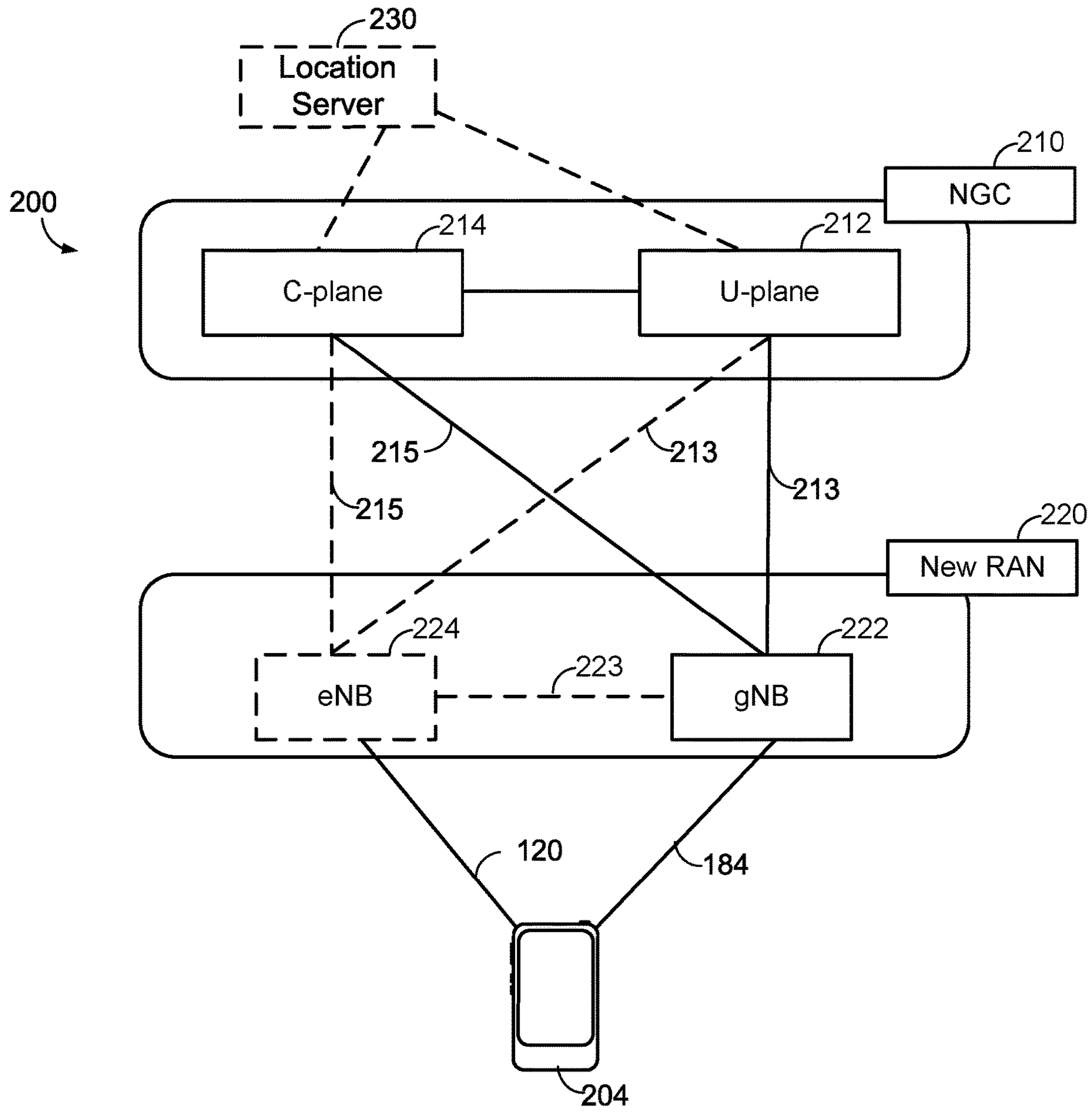
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
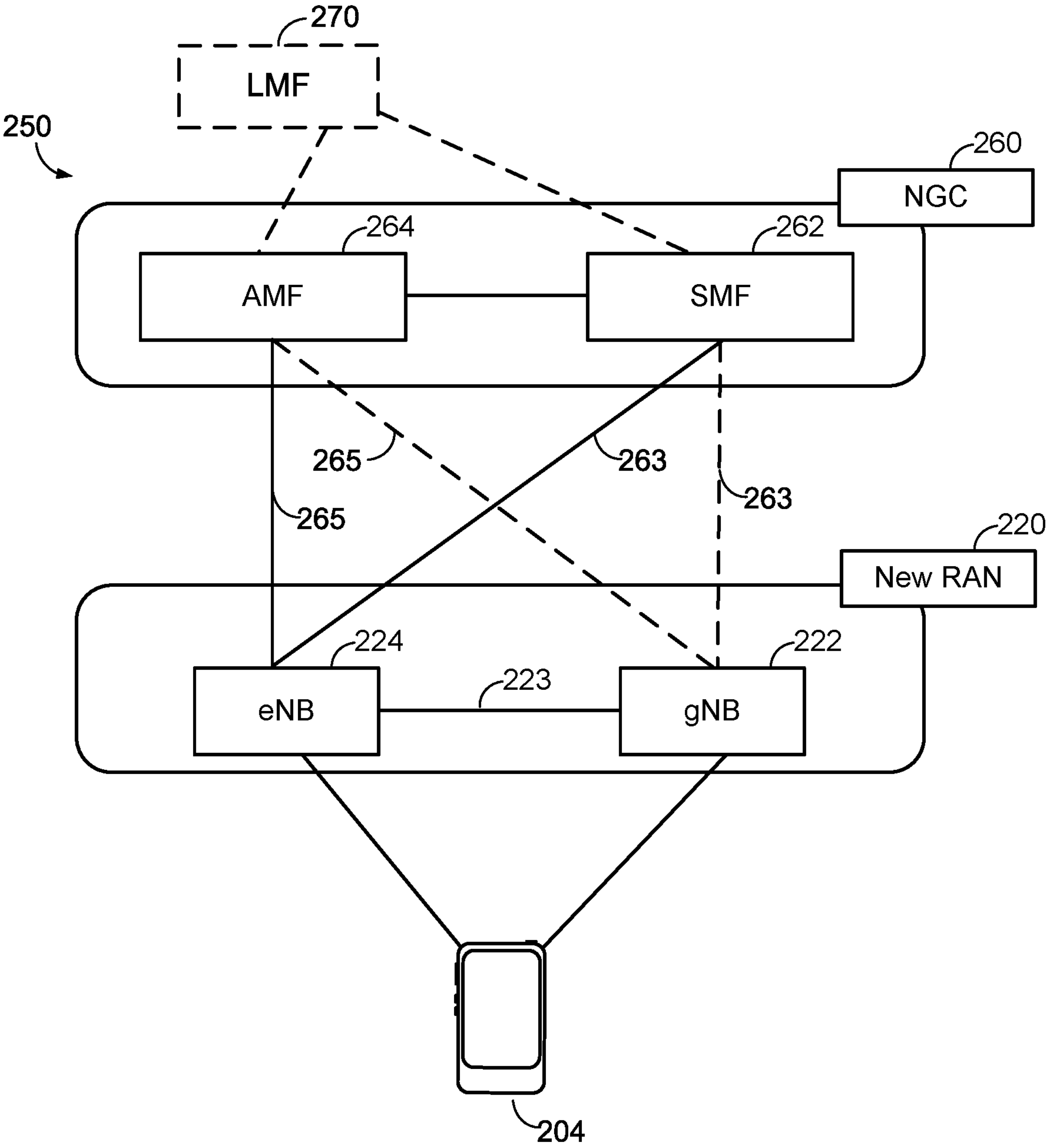

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
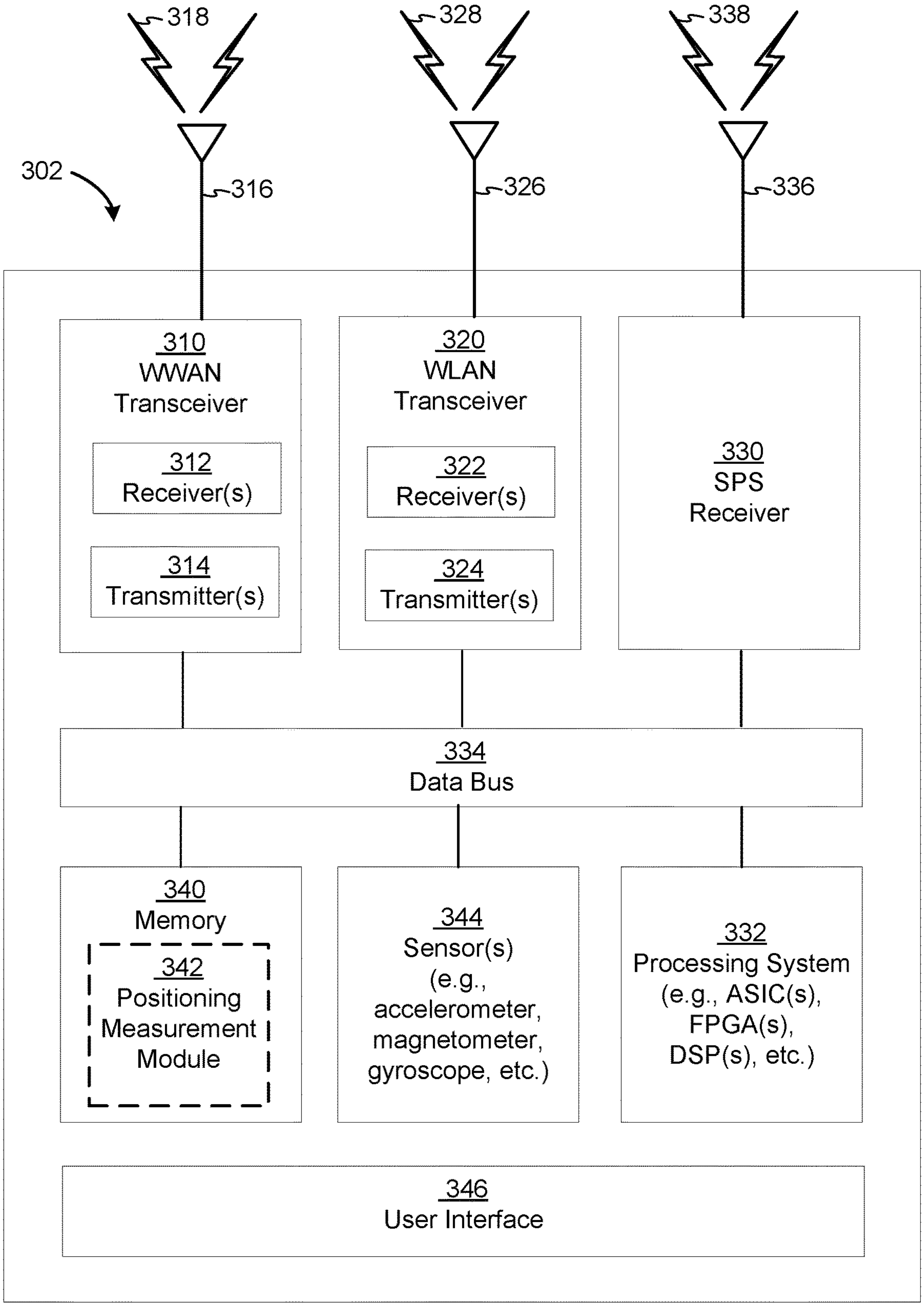
FIGS. 3A to 3C are simplified block diagrams of several sample aspects of components that may be employed in wireless communication nodes and configured to support communication as taught herein.
Figure 3B:
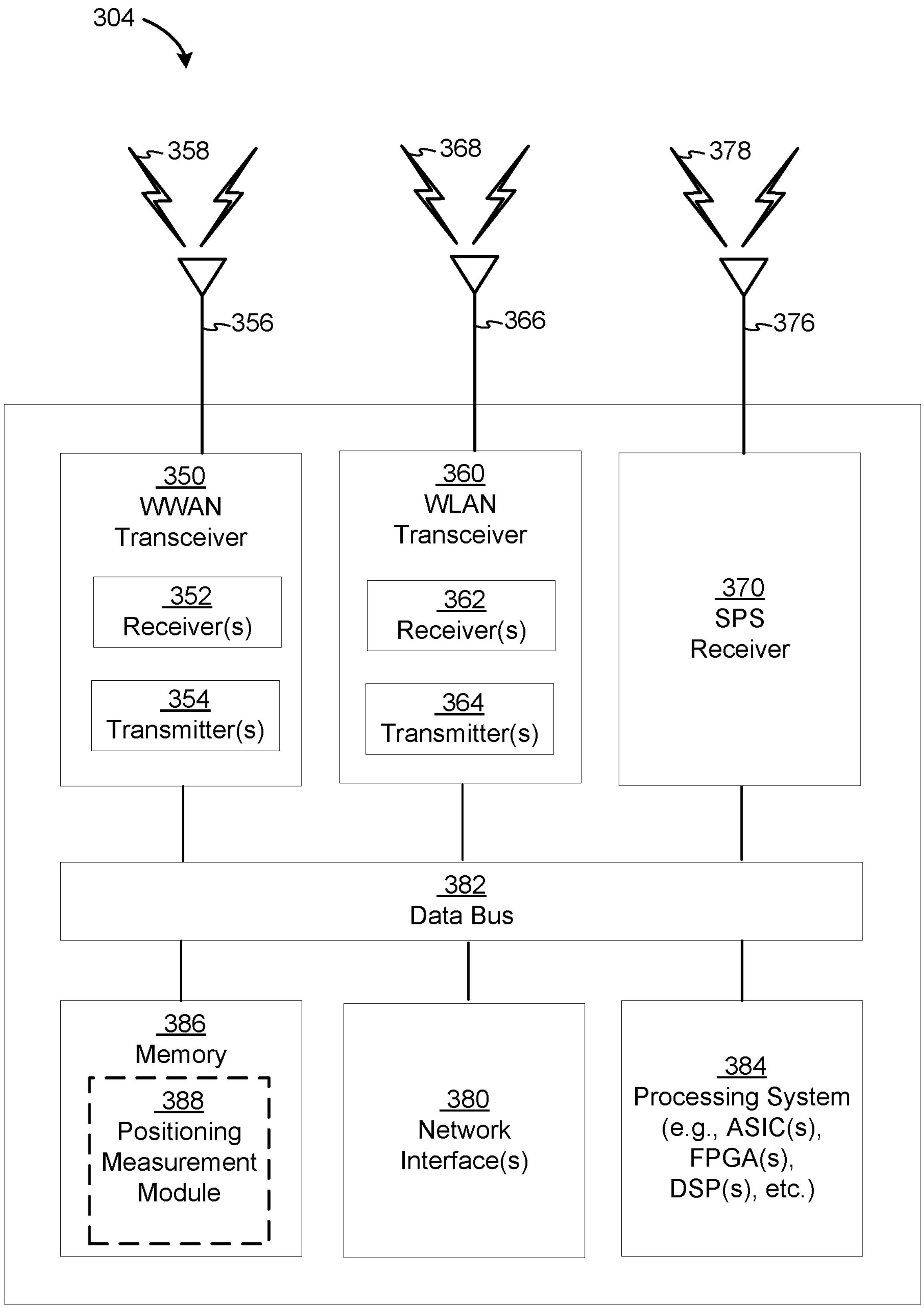
Figure 3C:
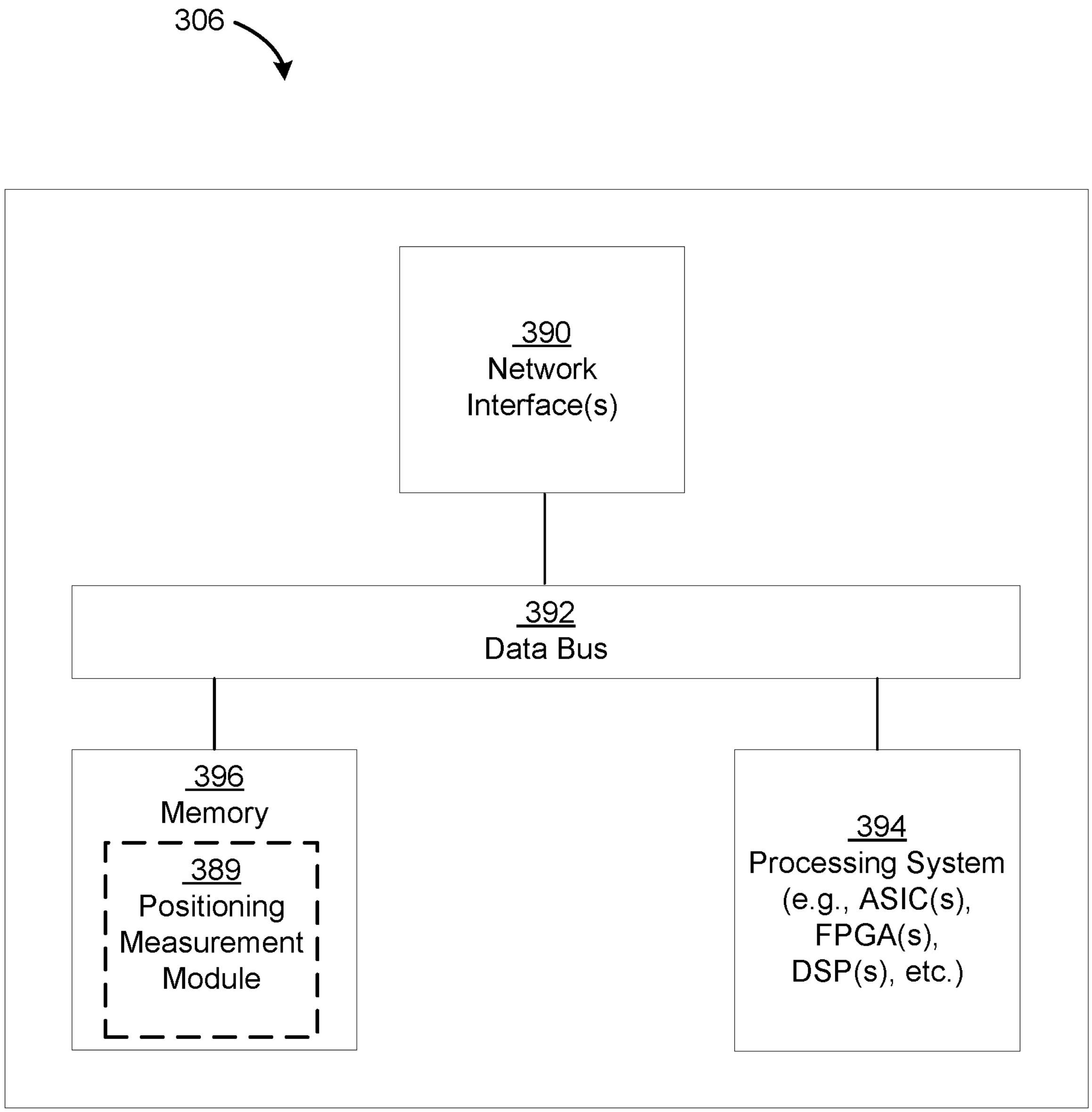

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include positioning measurement modules 342, 388 and 389, respectively. The positioning measurement modules 342, 388 and 389 may be hardware circuits that are part of or coupled to the processing systems 332, 384, and 394, respectively, that, when executed, cause the apparatuses 302, 304, and 306 to perform the functionality described herein. Alternatively, the positioning measurement modules 342, 388 and 389 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver

330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning measurement modules 342, 388 and 389, etc.

Figure 4A:
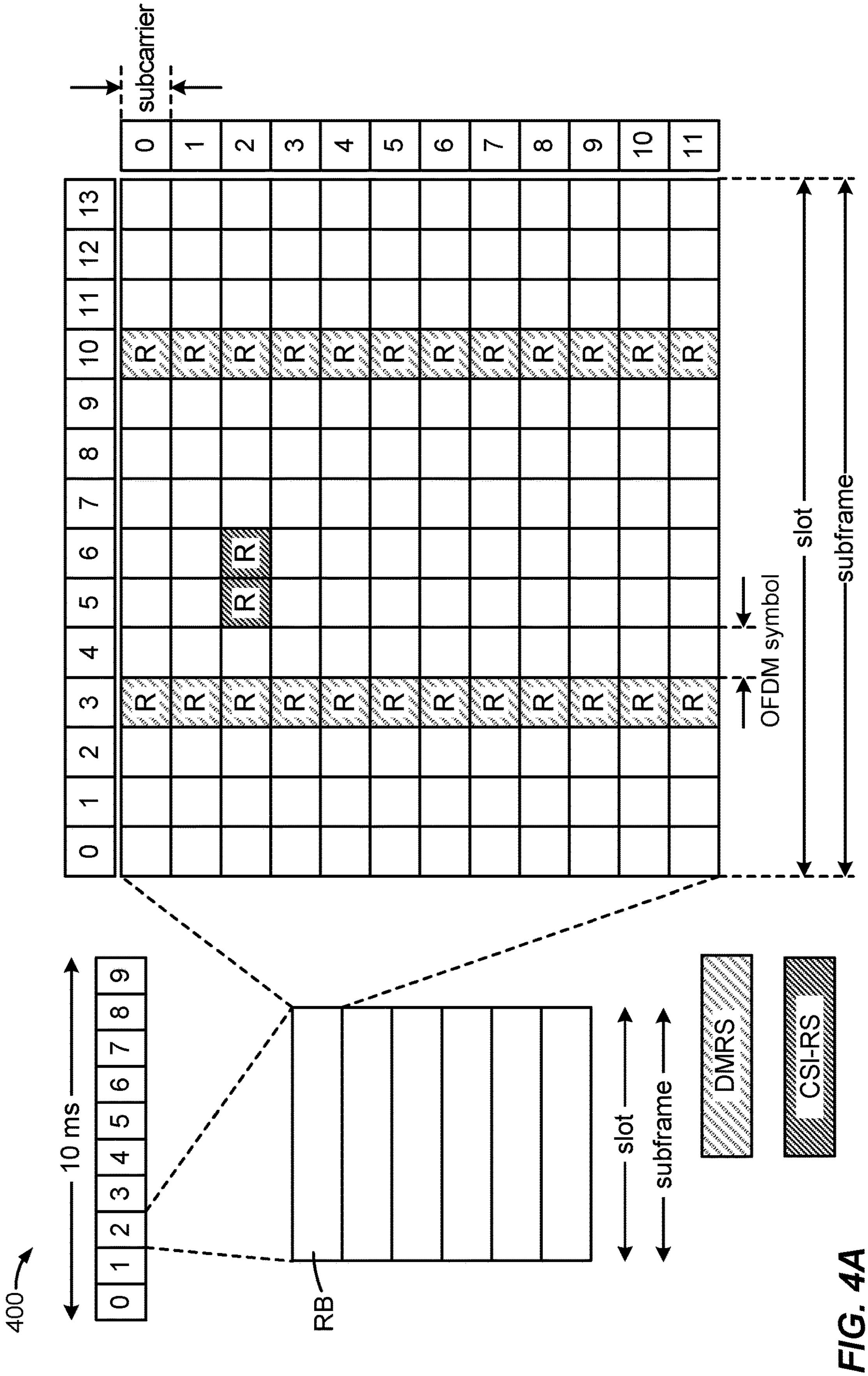
FIGS. 4A and 4B are diagrams illustrating examples of frame structures and channels within the frame structures, according to aspects of the disclosure.
Figure 4B:
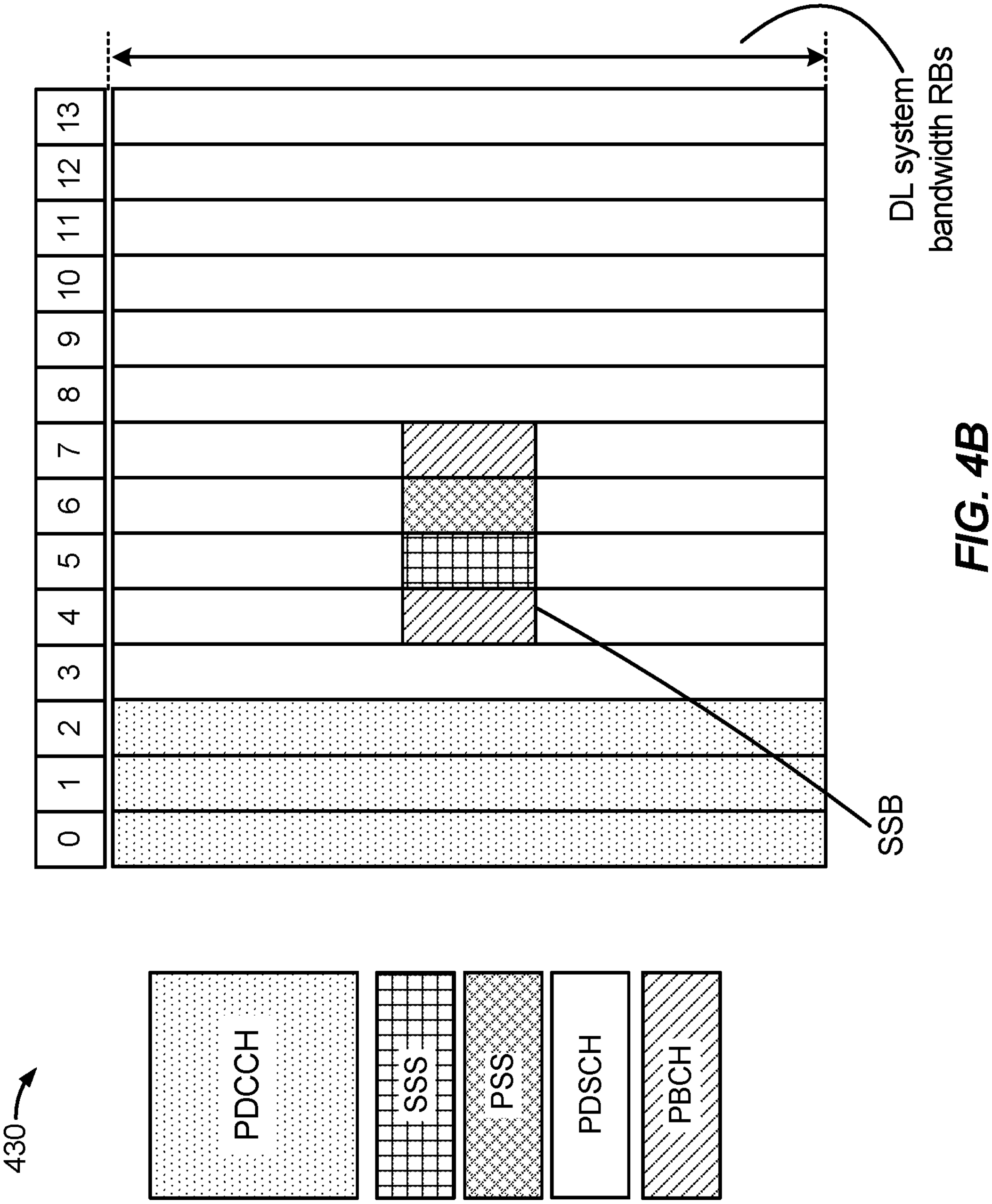

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

Figure 5:
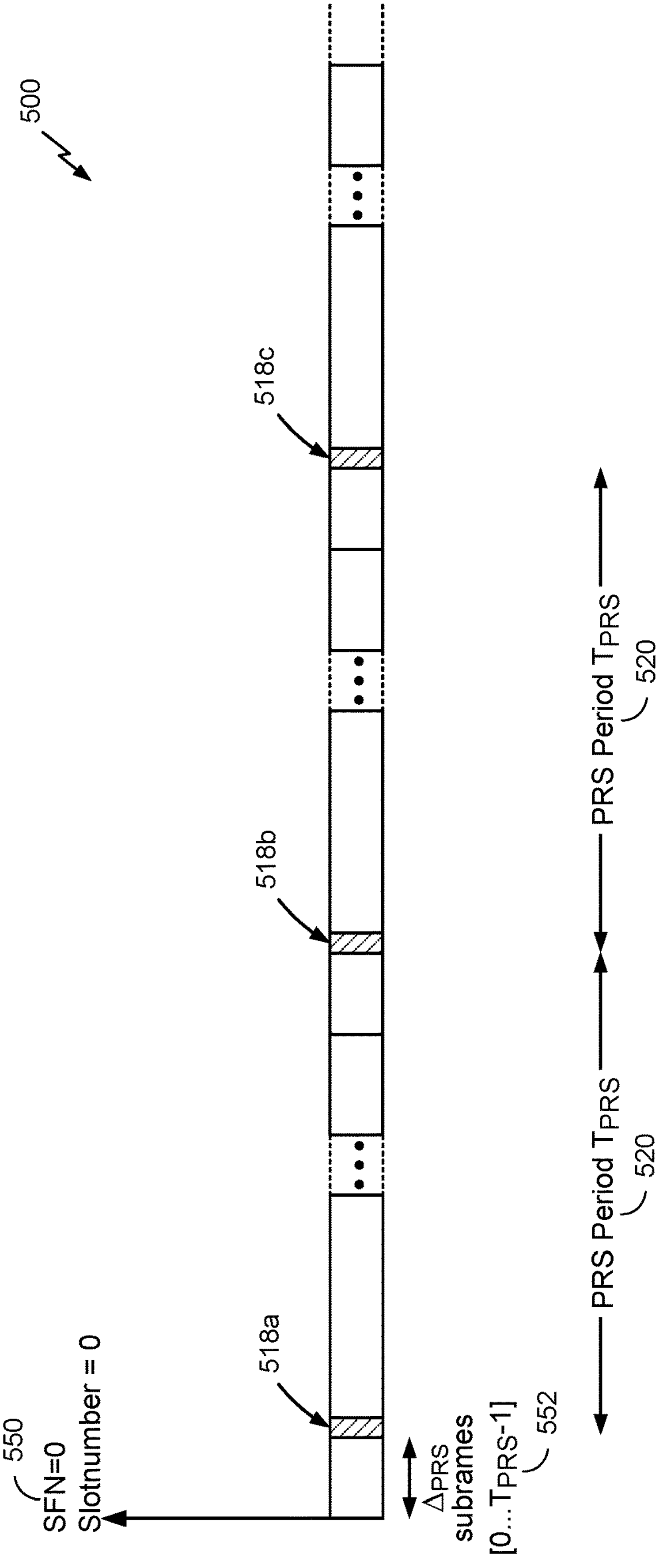
FIG. 5 illustrates an exemplary PRS configuration for a cell supported by a wireless node.

In some cases, the DL RS illustrated in FIG. 4A may be positioning reference signals (PRS). FIG. 5 illustrates an exemplary PRS configuration 500 for a cell supported by a wireless node (such as a base station 102). FIG. 5 shows how PRS positioning occasions are determined by a system frame number (SFN), a cell specific subframe offset ($\Delta_{PRS}$) 552, and the PRS periodicity ($T_{PRS}$) 520. Typically, the cell specific PRS subframe configuration is defined by a "PRS Configuration Index"/PRS included in observed time difference of arrival (OTDOA) assistance data. The PRS periodicity ($T_{PRS}$) 520 and the cell specific subframe offset ($\Delta_{PRS}$) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the SFN of a cell that transmits PRS. PRS instances, for the first subframe of the NPRS downlink subframes comprising a first PRS positioning occasion, may satisfy:

$$(10=n_f+\lfloor n_s/2\rfloor-\Delta_{PRS})\text{mod } T_{PRS}-0,$$

where $n_f$ is the SFN with $0\le n_f\le 1023$, $n_s$ is the slot number within the radio frame defined by $n_f$ with $0\le n_s\le 19$, $T_{PRS}$ is the PRS periodicity 520, and APRS is the cell-specific subframe offset 552.

As shown in FIG. 5, the cell specific subframe offset $\Delta_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes ($N_{PRS}$) in each of the consecutive PRS positioning occasions 518*a*, 518*b*, and 518*c* equals 4. That is, each shaded block representing PRS positioning occasions 518*a*, 518*b*, and 518*c* represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset $\Delta_{PRS}$ using Table 2. The UE may then determine the radio frame, subframe, and slot when a PRS is scheduled in the cell (e.g., using equation (1)). The OTDOA assistance data may be determined by, for example, the location server (e.g., location server 230, LMF 270), and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations 102) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE can obtain the cell timing (e.g., SFN) of at least one of the cells, e.g., the reference cell or a serving cell. The timing of the other cells may then be derived by the UE based, for example, on the assumption that PRS occasions from different cells overlap.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). In some designs, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE or NR systems. However, as used herein, unless otherwise indicated, the terms "positioning reference signal" and "PRS" refer to any type of reference signal that can be used for positioning, such as but not limited to, PRS signals in LTE or NR, navigation reference signals (NRSs) in 5G, transmitter reference signals (TRSs), cell-specific reference signals (CRSs), channel state information reference signals (CSI-RSs), primary synchronization signals (PSSs), secondary synchronization signals (SSSs), SSB, etc.

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning (SRS-P), such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, SRSs in NR are UE-specifically configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of R are 1, 2, 4 where $R \le N_{symb}^{SRS}$.

Transmission comb spacing KTC and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , $K_{TC\text{-}}1$ REs. Thus, for comb spacing $K_{TC}=2$, there are 2 different combs available for multiplexing if needed, and for comb spacing $K_{TC}=4$, there are 4 different available combs.

Periodicity and slot offset for the case of periodic/semi-persistent SRS.

Sounding bandwidth within a bandwidth part.

For low latency positioning, a gNB may trigger a UL SRS-P via a DCI (e.g., transmitted SRS-P may include repetition or beam-sweeping to enable several gNBs to receive the SRS-P). Alternatively, the gNB may send information regarding aperiodic PRS transmission to the UE (e.g., this configuration may include information about PRS from multiple gNBs to enable the UE to perform timing computations for positioning (UE-based) or for reporting (UE-assisted). While various embodiments of the present disclosure relate to DL PRS-based positioning procedures, some or all of such embodiments may also apply to UL SRS-P-based positioning procedures.

Note that the terms "sounding reference signal", "SRS" and "SRS-P" may sometimes refer to specific reference signals that are used for positioning in LTE or NR systems. However, as used herein, unless otherwise indicated, the terms "sounding reference signal", "SRS" and "SRS-P" refer to any type of reference signal that can be used for positioning, such as but not limited to, SRS signals in LTE or NR, navigation reference signals (NRSs) in 5G, transmitter reference signals (TRSs), random access channel (RACH) signals for positioning (e.g., RACH preambles, such as Msg-1 in 4-Step RACH procedure or Msg-A in 2-Step RACH procedure), etc.

3GPP Rel. 16 introduced various NR positioning aspects directed to increase location accuracy of positioning schemes that involve measurement(s) associated with one or more UL or DL PRSs (e.g., higher bandwidth (BW), FR2 beam-sweeping, angle-based measurements such as Angle of Arrival (AoA) and Angle of Departure (AoD) measurements, multi-cell Round-Trip Time (RTT) measurements, etc.). If latency reduction is a priority, then UE-based positioning techniques (e.g., DL-only techniques without UL location measurement reporting) are typically used. However, if latency is less of a concern, then UE-assisted positioning techniques can be used, whereby UE-measured data is reported to a network entity (e.g., location server 230, LMF 270, etc.). Latency associated UE-assisted positioning techniques can be reduced somewhat by implementing the LMF in the RAN.

Layer-3 (L3) signaling (e.g., RRC or Location Positioning Protocol (LPP)) is typically used to transport reports that comprise location-based data in association with UE-assisted positioning techniques. L3 signaling is associated with relatively high latency (e.g., above 100 ms) compared with Layer-1 (L1, or PHY layer) signaling or Layer-2 (L2, or MAC layer) signaling. In some cases, lower latency (e.g., less than 100 ms, less than 10 ms, etc.) between the UE and the RAN for location-based reporting may be desired. In such cases, L3 signaling may not be capable of reaching these lower latency levels. L3 signaling of positioning measurements may comprise any combination of the following:

- One or multiple TOA, TDOA, RSRP or Rx-Tx measurements,
- One or multiple AoA/AoD (e.g., currently agreed only for gNB→LMF reporting DL AoA and UL AoD) measurements,
- One or multiple Multipath reporting measurements, e.g., per-path ToA, RSRP, AoA/AoD (e.g., currently only per-path ToA allowed in LTE)
- One or multiple motion states (e.g., walking, driving, etc.) and trajectories (e.g., currently for UE), and/or
- One or multiple report quality indications.

More recently, L1 and L2 signaling has been contemplated for use in association with PRS-based reporting. For example, L1 and L2 signaling is currently used in some systems to transport CSI reports (e.g., reporting of Channel Quality Indications (CQIs), Precoding Matrix Indicators (PMIs), Layer Indicators (Lis), L1-RSRP, etc.). CSI reports may comprise a set of fields in a pre-defined order (e.g., defined by the relevant standard). A single UL transmission (e.g., on PUSCH or PUCCH) may include multiple reports, referred to herein as 'sub-reports', which are arranged according to a pre-defined priority (e.g., defined by the relevant standard). In some designs, the pre-defined order may be based on an associated sub-report periodicity (e.g., aperiodic/semi-persistent/periodic (A/SP/P) over PUSCH/PUCCH), measurement type (e.g., L1-RSRP or not), serving cell index (e.g., in carrier aggregation (CA) case), and reportconfigID. With 2-part CSI reporting, the part 1_s_ of all reports are grouped together, and the part 2_s_ are grouped separately, and each group is separately encoded (e.g., part 1 payload size is fixed based on configuration parameters, while part 2 size is variable and depends on configuration parameters and also on associated part 1 content). A number of coded bits/symbols to be output after encoding and rate-matching is computed based on a number of input bits and beta factors, per the relevant standard. Linkages (e.g., time offsets) are defined between instances of RSs being measured and corresponding reporting. In some designs, CSI-like reporting of PRS-based measurement data using L1 and L2 signaling may be implemented.

Figure 6:
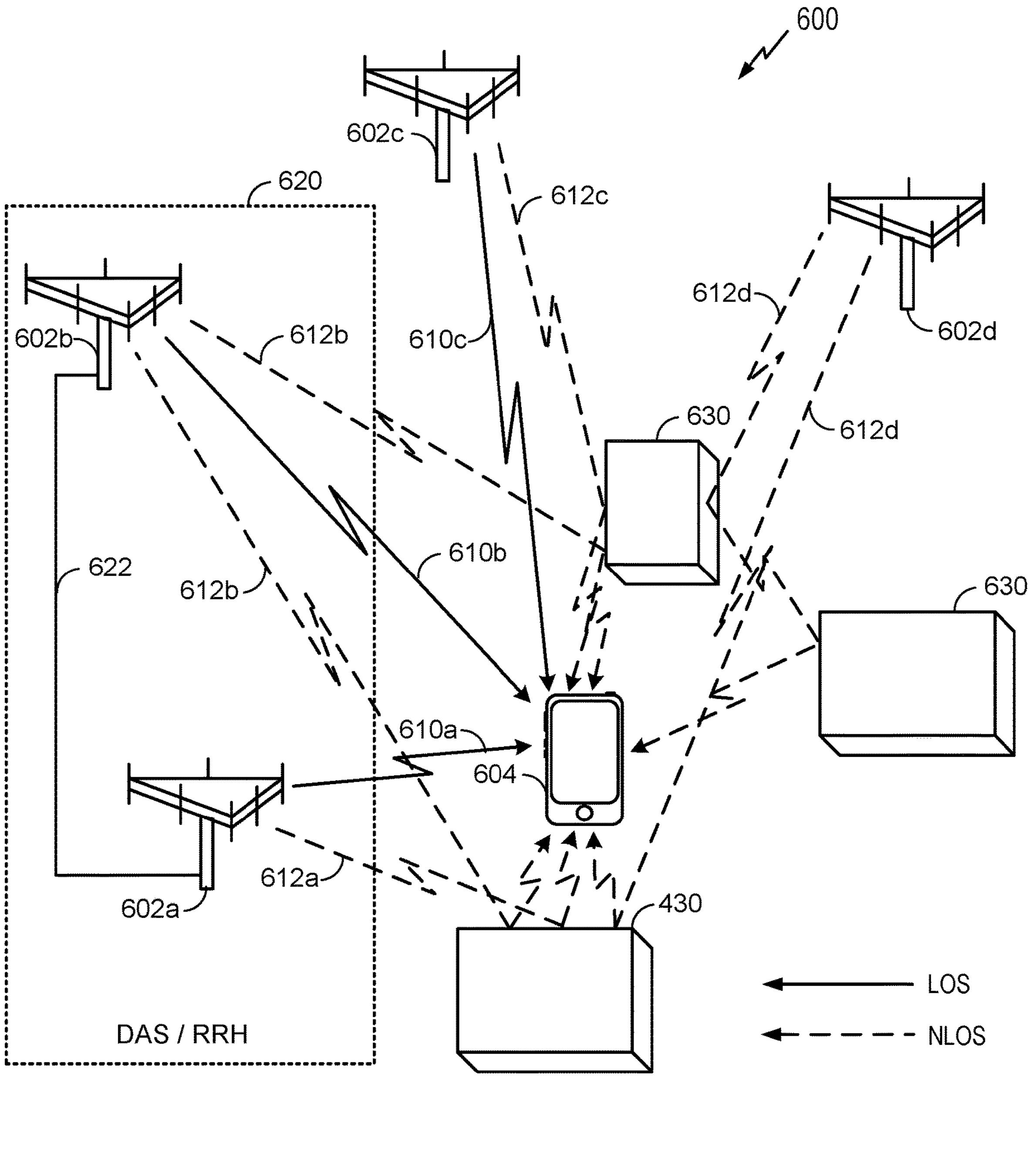
FIG. 6 illustrates an exemplary wireless communications system according to various aspects of the disclosure.

FIG. 6 illustrates an exemplary wireless communications system 600 according to various aspects of the disclosure. In the example of FIG. 6, a UE 604, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602_a-d_ (collectively, base stations 602), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 600 (i.e., the base stations locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and four base stations 602, as will be appreciated, there may be more UEs 604 and more or fewer base stations 602.

To support position estimates, the base stations 602 may be configured to broadcast reference RF signals (e.g., Positioning Reference Signals (PRS), Cell-specific Reference Signals (CRS), Channel State Information Reference Signals (CSI-RS), synchronization signals, etc.) to UEs 604 in their coverage areas to enable a UE 604 to measure reference RF signal timing differences (e.g., OTDOA or reference signal time difference (RSTD)) between pairs of network nodes and/or to identify the beam that best excite the LOS or shortest radio path between the UE 604 and the transmitting base stations 602. Identifying the LOS/shortest path beam(s) is of interest not only because these beams can subsequently be used for OTDOA measurements between a pair of base stations 602, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 602, a cell of a base station 602, a remote radio head, an antenna of a base station 602, where the locations of the antennas of a base station 602 are distinct from the location of the base station 602 itself, or any other network entity capable of transmitting reference signals. Further, as used herein, a "node" may refer to either a network node or a UE.

A location server (e.g., location server 230) may send assistance data to the UE 604 that includes an identification of one or more neighbor cells of base stations 602 and configuration information for reference RF signals transmitted by each neighbor cell. Alternatively, the assistance data can originate directly from the base stations 602 themselves (e.g., in periodically broadcasted overhead messages, etc.). Alternatively, the UE 604 can detect neighbor cells of base stations 602 itself without the use of assistance data. The UE 604 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 602 or antenna(s) that transmitted the reference RF signals that the UE 604 measured), the UE 604 or the location server can determine the distance between the UE 604 and the measured network nodes and thereby calculate the location of the UE 604.

The term "position estimate" is used herein to refer to an estimate of a position for a UE 604, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 602) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 604) and a neighbor base station whose reference RF signals the UE is measuring. Thus, FIG. 6 illustrates an aspect in which base stations 602*a* and 602*b* form a DAS/RRH 620. For example, the base station 602*a* may be the serving base station of the UE 604 and the base station 602*b* may be a neighbor base station of the UE 604. As such, the base station 602*b* may be the RRH of the base station 602*a*. The base stations 602*a* and 602*b* may communicate with each other over a wired or wireless link 622.

To accurately determine the position of the UE 604 using the OTDOAs and/or RSTDs between RF signals received from pairs of network nodes, the UE 604 needs to measure the reference RF signals received over the LOS path (or the shortest NLOS path where an LOS path is not available), between the UE 604 and a network node (e.g., base station 602, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 6 illustrates a number of LOS paths 610 and a number of NLOS paths 612 between the base stations 602 and the UE 604. Specifically, FIG. 6 illustrates base station 602*a* transmitting over an LOS path 610*a* and an NLOS path 612*a*, base station 602*b* transmitting over an LOS path 610*b* and two NLOS paths 612*b*, base station 602*c* transmitting over an LOS path 610*c* and an NLOS path 612*c*, and base station 602*d* transmitting over two NLOS paths 612*d*. As illustrated in FIG. 6, each NLOS path 612 reflects off some object 630 (e.g., a building). As will be appreciated, each LOS path 610 and NLOS path 612 transmitted by a base station 602 may be transmitted by different antennas of the base station 602 (e.g., as in a MIMO system), or may be transmitted by the same antenna of a base station 602 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 602 may be configured to use beamforming to transmit RF signals. In that case, some of the available beams may focus the transmitted RF signal along the LOS paths 610 (e.g., the beams produce highest antenna gain along the LOS paths) while other available beams may focus the transmitted RF signal along the NLOS paths 612. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 602 uses beamforming to transmit RF signals, the beams of interest for data communication between the base station 602 and the UE 604 will be the beams carrying RF signals that arrive at UE 604 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 610). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 7, in some cases, the signal strength of RF signals on the LOS path 610 may be weaker (e.g., due to obstructions) than the signal strength of RF signals on an NLOS path 612, over which the RF signals arrive later due to propagation delay.

Figure 7:
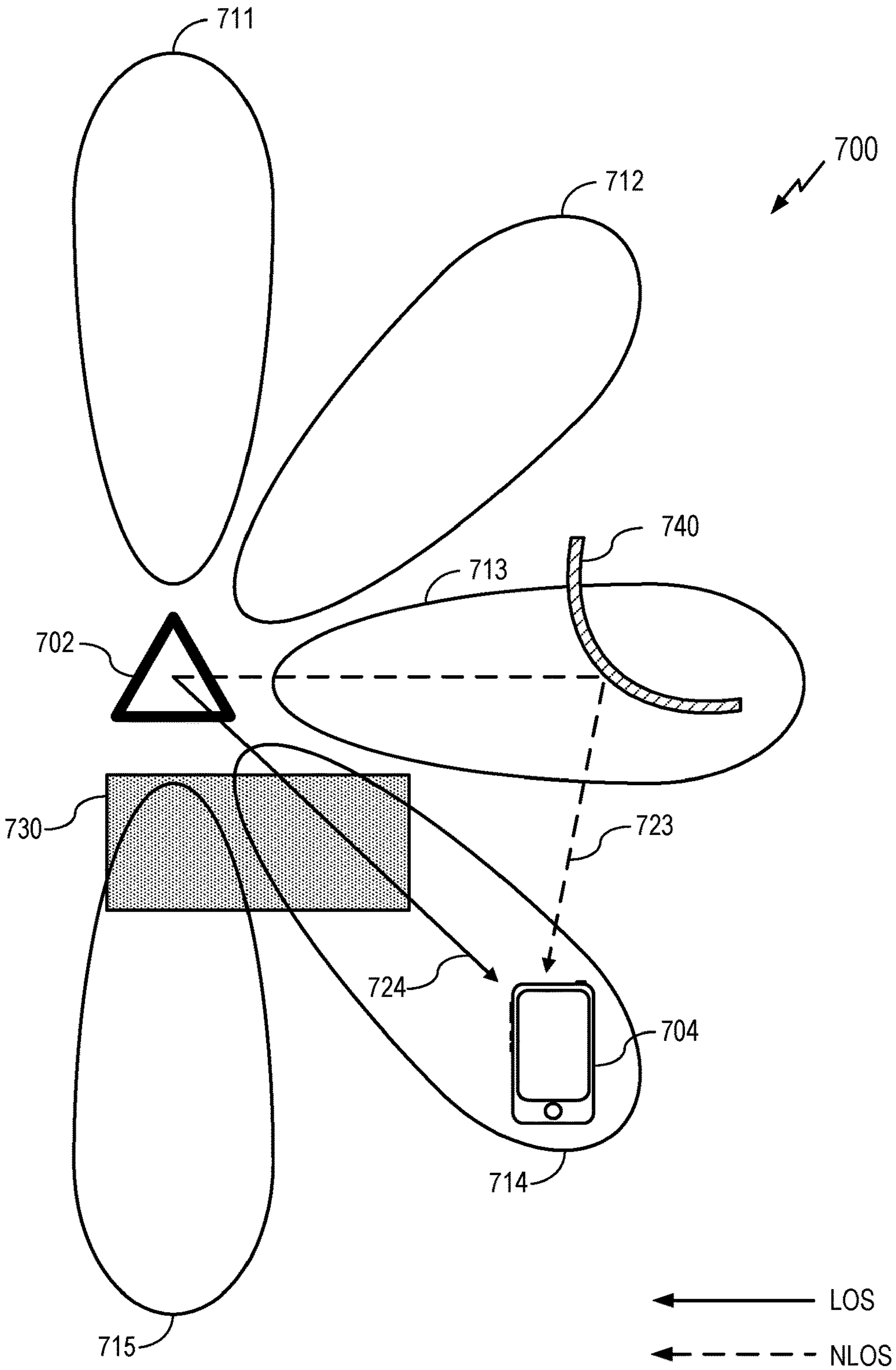
FIG. 7 illustrates an exemplary wireless communications system according to various aspects of the disclosure.

FIG. 7 illustrates an exemplary wireless communications system 700 according to various aspects of the disclosure. In the example of FIG. 7, a UE 704, which may correspond to UE 604 in FIG. 6, is attempting to calculate an estimate of its position, or to assist another entity (e.g., a base station or core network component, another UE, a location server, a third party application, etc.) to calculate an estimate of its position. The UE 704 may communicate wirelessly with a base station 702, which may correspond to one of base stations 602 in FIG. 6, using RF signals and standardized protocols for the modulation of the RF signals and the exchange of information packets.

As illustrated in FIG. 7, the base station 702 is utilizing beamforming to transmit a plurality of beams 711-715 of RF signals. Each beam 711-715 may be formed and transmitted by an array of antennas of the base station 702. Although FIG. 7 illustrates a base station 702 transmitting five beams 711-715, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 711-715 for purposes of distinguishing RF signals associated with one beam from RF signals associated with another beam. Moreover, the RF signals associated with a particular beam of the plurality of beams 711-715 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 7, the UE 704 receives an NLOS data stream 723 of RF signals transmitted on beam 713 and an LOS data stream 724 of RF signals transmitted on beam 714. Although FIG. 7 illustrates the NLOS data stream 723 and the LOS data stream 724 as single lines (dashed and solid, respectively), as will be appreciated, the NLOS data stream 723 and the LOS data stream 724 may each comprise multiple rays (i.e., a "cluster") by the time they reach the UE 704 due, for example, to the propagation characteristics of RF signals through multipath channels. For example, a cluster of RF signals is formed when an electromagnetic wave is reflected off of multiple surfaces of an object, and reflections arrive at the receiver (e.g., UE 704) from roughly the same angle, each travelling a few wavelengths (e.g., centimeters) more or less than others. A "cluster" of received RF signals generally corresponds to a single transmitted RF signal.

In the example of FIG. 7, the NLOS data stream 723 is not originally directed at the UE 704, although, as will be appreciated, it could be, as are the RF signals on the NLOS paths 612 in FIG. 6. However, it is reflected off a reflector 740 (e.g., a building) and reaches the UE 704 without obstruction, and therefore, may still be a relatively strong RF signal. In contrast, the LOS data stream 724 is directed at the UE 704 but passes through an obstruction 730 (e.g., vegetation, a building, a hill, a disruptive environment such as clouds or smoke, etc.), which may significantly degrade the RF signal. As will be appreciated, although the LOS data stream 724 is weaker than the NLOS data stream 723, the LOS data stream 724 will arrive at the UE 704 before the NLOS data stream 723 because it follows a shorter path from the base station 702 to the UE 704.

As noted above, the beam of interest for data communication between a base station (e.g., base station 702) and a UE (e.g., UE 704) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 714). That is, even if beam 713 (the NLOS beam) were to weakly excite the LOS path (due to the propagation characteristics of RF signals, even though not being focused along the LOS path), that weak signal, if any, of the LOS path of beam 713 may not be as reliably detectable (compared to that from beam 714), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 7, where the UE 704 is engaged in a data communication session with the base station 702 (e.g., where the base station 702 is the serving base station for the UE 704) and not simply attempting to measure reference RF signals transmitted by the base station 702, the beam of interest for the data communication session may be the beam 713, as it is carrying the unobstructed NLOS data stream 723. The beam of interest for position estimation, however, would be the beam 714, as it carries the strongest LOS data stream 724, despite being obstructed.

Figure 8A:
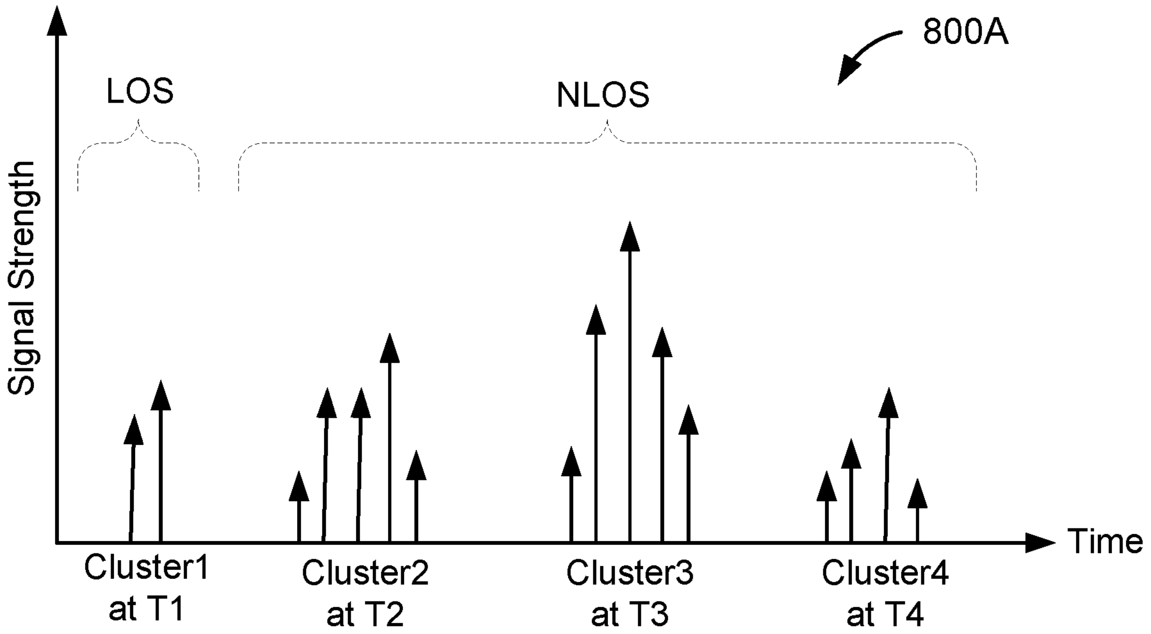
FIG. 8A is a graph showing the RF channel response at a receiver over time according to aspects of the disclosure.
Figure 8B:
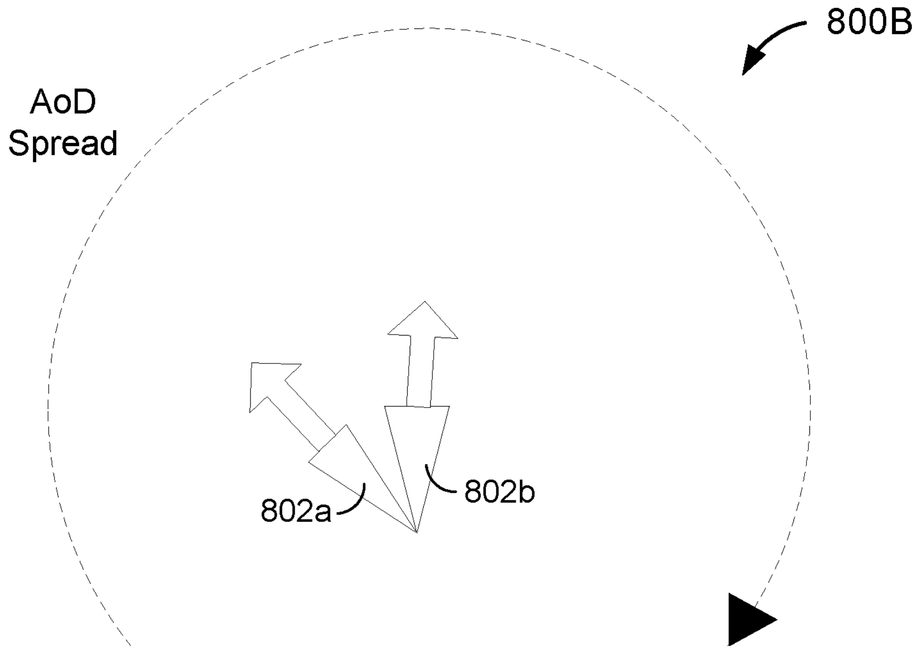
FIG. 8B is a diagram illustrating this separation of clusters in AoD.

FIG. 8A is a graph 800A showing the RF channel response at a receiver (e.g., UE 704) over time according to aspects of the disclosure. Under the channel illustrated in FIG. 8A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 8A, because the first cluster of RF signals at time T1 arrives first, it is presumed to be the LOS data stream (i.e., the data stream arriving over the LOS or the shortest path), and may correspond to the LOS data stream 724. The third cluster at time T3 is comprised of the strongest RF signals, and may correspond to the NLOS data stream 723. Seen from the transmitter's side, each cluster of received RF signals may comprise the portion of an RF signal transmitted at a different angle, and thus each cluster may be said to have a different angle of departure (AoD) from the transmitter. FIG. 8B is a diagram 800B illustrating this separation of clusters in AoD. The RF signal transmitted in AoD range 802*a* may correspond to one cluster (e.g., "Cluster1") in FIG. 8A, and the RF signal transmitted in AoD range 802*b* may correspond to a different cluster (e.g., "Cluster3") in FIG. 8A. Note that although AoD ranges of the two clusters depicted in FIG. 8B are spatially isolated, AoD ranges of some clusters may also partially overlap even though the clusters are separated in time. For example, this may arise when two separate buildings at same AoD from the transmitter reflect the signal towards the receiver. Note that although FIG. 8A illustrates clusters of two to five channel taps (or "peaks"), as will be appreciated, the clusters may have more or fewer than the illustrated number of channel taps.

RAN1 NR may define UE measurements on DL reference signals (e.g., for serving, reference, and/or neighboring cells) applicable for NR positioning, including DL reference signal time difference (RSTD) measurements for NR positioning, DL RSRP measurements for NR positioning, and UE Rx-Tx (e.g., a hardware group delay from signal reception at UE receiver to response signal transmission at UE transmitter, e.g., for time difference measurements for NR positioning, such as RTT).

RAN1 NR may define gNB measurements based on UL reference signals applicable for NR positioning, such as relative UL time of arrival (RTOA) for NR positioning, UL AoA measurements (e.g., including Azimuth and Zenith Angles) for NR positioning, UL RSRP measurements for NR positioning, and gNB Rx-Tx (e.g., a hardware group delay from signal reception at gNB receiver to response signal transmission at gNB transmitter, e.g., for time difference measurements for NR positioning, such as RTT).

Figure 9:
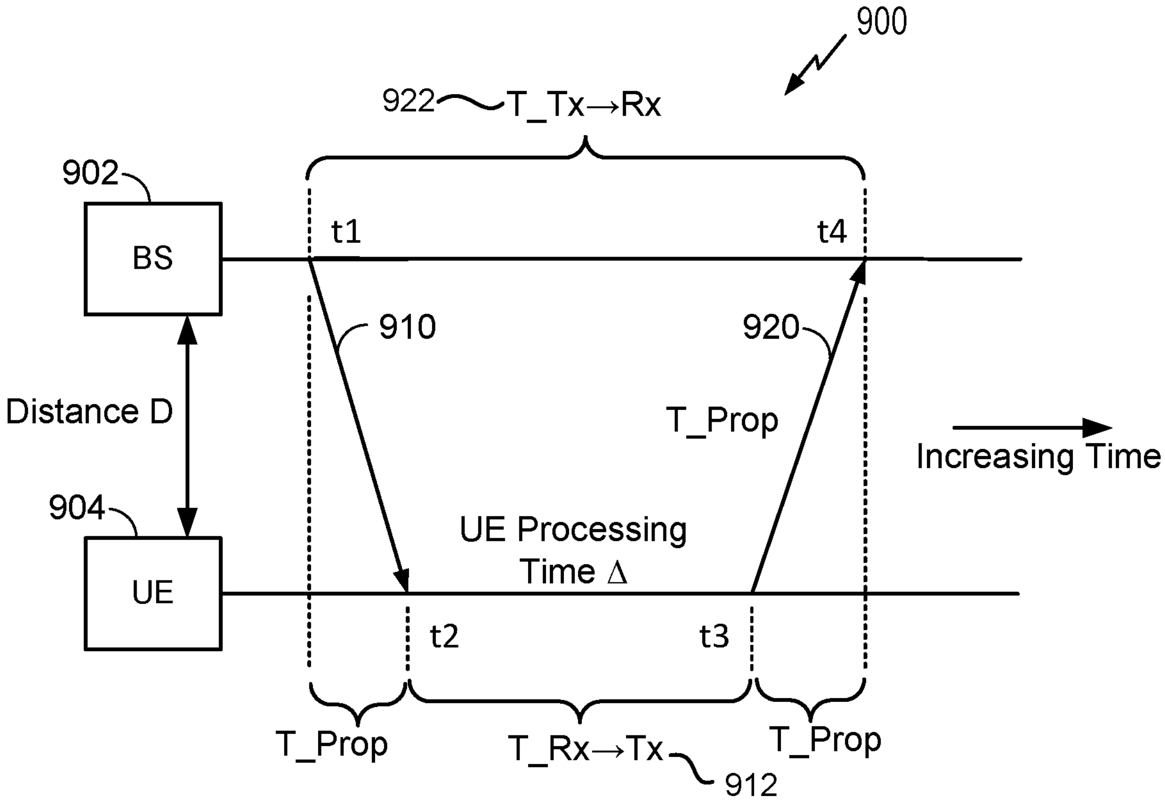
FIG. 9 is a diagram showing exemplary timings of RTT measurement signals exchanged between a base station and a UE, according to aspects of the disclosure.

FIG. 9 is a diagram 900 showing exemplary timings of RTT measurement signals exchanged between a base station

902 (e.g., any of the base stations described herein) and a UE 904 (e.g., any of the UEs described herein), according to aspects of the disclosure. In the example of FIG. 9, the base station 902 sends an RTT measurement signal 910 (e.g., PRS, NRS, CRS, CSI-RS, etc.) to the UE 904 at time $t_1$. The RTT measurement signal 910 has some propagation delay $T_{Prop}$ as it travels from the base station 902 to the UE 904. At time $t_2$ (the ToA of the RTT measurement signal 910 at the UE 904), the UE 904 receives/measures the RTT measurement signal 910. After some UE processing time, the UE 904 transmits an RTT response signal 920 at time $t_3$. After the propagation delay $T_{Prop}$, the base station 902 receives/measures the RTT response signal 920 from the UE 904 at time $t_4$ (the ToA of the RTT response signal 920 at the base station 902).

In order to identify the ToA (e.g., $t_2$) of a reference signal (e.g., an RTT measurement signal 910) transmitted by a given network node (e.g., base station 902), the receiver (e.g., UE 904) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may choose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

In some designs, the RTT response signal 920 may explicitly include the difference between time $t_3$ and time $t_2$ (i.e., $T_{Rx\rightarrow Tx}$ 912). Using this measurement and the difference between time $t_4$ and time $t_1$ (i.e., $T_{Tx\rightarrow Rx}$ 922), the base station 902 (or other positioning entity, such as location server 230, LMF 270) can calculate the distance to the UE 904 as:

$$d = \frac{1}{2c}(T_{Tx\rightarrow Rx} - T_{Rx\rightarrow Tx}) = \frac{1}{2c}(t_2 - t_1) - \frac{1}{2c}(t_4 - t_3)$$

where c is the speed of light. While not illustrated expressly in FIG. 9, an additional source of delay or error may be due to UE and gNB hardware group delay for position location.

Various parameters associated with positioning can impact power consumption at the UE. Knowledge of such parameters can be used to estimate (or model) the UE power consumption. By accurately modeling the power consumption of the UE, various power saving features and/or performance enhancing features can be utilized in a predictive manner so as to improve the user experience.

Figure 10:
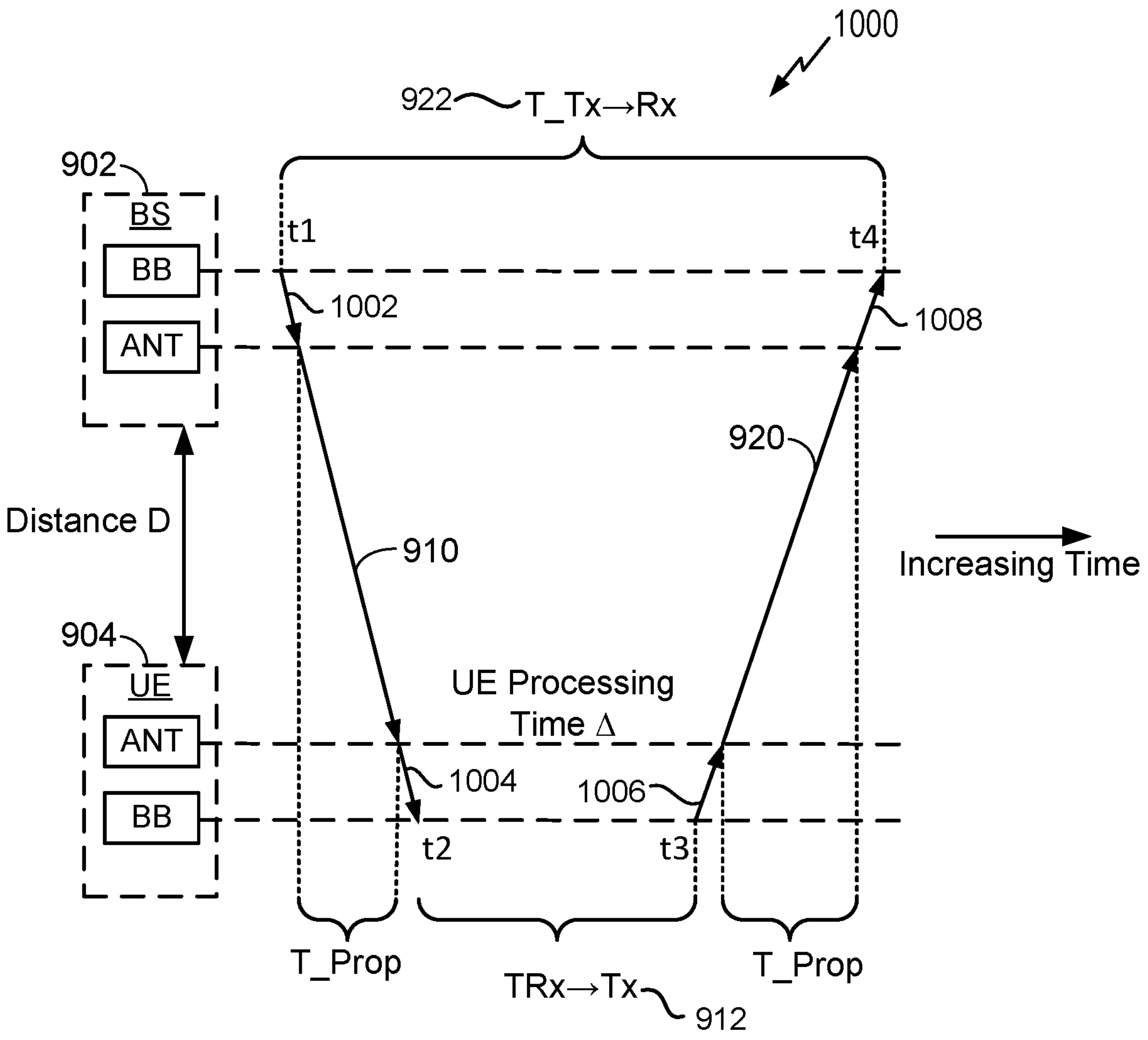
FIG. 10 is a diagram showing exemplary timings of RTT measurement signals exchanged between a base station and a UE, according to other aspects of the disclosure.

An additional source of delay or error is due to UE and gNB hardware group delay for position location. FIG. 10 illustrates a diagram 1000 showing exemplary timings of RTT measurement signals exchanged between a base station (gNB) (e.g., any of the base stations described herein) and a UE (e.g., any of the UEs described herein), according to aspects of the disclosure. FIG. 10 is similar in some respects to FIG. 9. However, in FIG. 10, the UE and gNB hardware group delay (which is primarily due to internal hardware delays between a baseband (BB) component and antenna (ANT) at the UE and gNB) is shown with respect 1002-1008. As will be appreciated, both Tx-side and Rx-side path-specific or beam-specific delays impact the RTT measurement.

The following definitions are used for the purpose of describing internal timing errors:

Transmit (Tx) timing error: From a signal transmission perspective, there is a time delay from the time when the digital signal is generated at the baseband to the time when the RF signal is transmitted from the transmit antenna. For supporting positioning, the UE/TRP may implement an internal calibration/compensation of the transmit time delay for the transmission of the DL-PRS/UL-SRS, which may also include the calibration/compensation of the relative time delay between different RF chains in the same UE/TRP. The compensation may also consider the offset of the transmit antenna phase center to the physical antenna center. However, the calibration may not be perfect. The remaining transmit time delay after the calibration, or the uncalibrated transmit time delay is defined as the "transmit timing error" or "Tx timing error."

Receive (Rx) timing error: From a signal reception perspective, there is a time delay from the time when the RF signal arrives at the Rx antenna to the time when the signal is digitized and time-stamped at the baseband. For supporting positioning, the UE/TRP may implement an internal calibration/compensation of the Rx time delay before it reports the measurements that are obtained from the DL-PRS/SRS, which may also include the calibration/compensation of the relative time delay between different RF chains in the same UE/TRP. The compensation may also consider the offset of the Rx antenna phase center to the physical antenna center. However, the calibration may not be perfect. The remaining Rx time delay after the calibration, or the uncalibrated Rx time delay, is defined as the "Rx timing error."

UE Tx timing error group (TEG): A UE Tx TEG (or TxTEG) is associated with the transmissions of one or more SRS resources for the positioning purpose, which have the Tx timing errors within a certain margin (e.g., within a threshold of each other).

TRP Tx TEG: A TRP Tx TEG (or TxTEG) is associated with the transmissions of one or more DL-PRS resources, which have the Tx timing errors within a certain margin.

UE Rx TEG: A UE Rx TEG (or RxTEG) is associated with one or more downlink measurements, which have the Rx timing errors within a certain margin.

TRP Rx TEG: A TRP Rx TEG (or RxTEG) is associated with one or more uplink measurements, which have the Rx timing errors within a margin.

UE Rx-Tx TEG: A UE Rx-Tx TEG (or RxTxTEG) is associated with one or more UE Rx-Tx time difference measurements, and one or more SRS resources for the positioning purpose, which have the Rx timing errors plus Tx timing errors within a certain margin.

TRP Rx-Tx TEG: A TRP Rx-Tx TEG (or RxTxTEG) is associated with one or more TRP Rx-Tx time difference measurements and one or more DL-PRS resources, which have the Rx timing errors plus Tx timing errors within a certain margin.

Hardware group delays such as 1002-1008 can contribute to timing errors and/or calibration errors that can impact RTT as well as other measurements such as TDOA, RSTD, and so on, which in turn can impact positioning performance. For example, in some designs, 10 nsec of error will introduce the 3 meter of error in the final fix.

In some designs, at the UE, for each panel (in case of multiple panels), the UE draws a random sample for the Tx error according to [−2*Y,2*Y] and another random sample for the Rx error according to the same [−2*Y,2*Y] distribution. For each gNB, for each panel (in case of multiple panels), the gNB draws a random sample for the Tx error according to [−2*X,2*X] and another random sample for the Rx error according to the same [−2*X,2*X] distribution. Any additional time varying aspects of the timing errors, if simulated, can be left up to each company to report. For UE evaluation assumptions in FR2, it is assumed that the UE can receive or transmit at most from one panel at a time with a panel activation delay of 0 ms.

Consider the case with respect to FR1 where a UE includes 4 Rx antennas, denoted as RX1, RX2, RX3, RX4. Some or all of these Rx antennas may have different group delays, timing errors and/or calibration errors because the respective Rx antennas may be located in different parts of the UE and the ANT-to-BB paths and components/switches are not the same. Some of the Rx antennas may be calibrated with known group delay errors, whereas some may not be calibrated. For each positioning occasion, the UE will measure the PRS (e.g., of a positioning reference cell) through each Rx antenna. The UE may select a different Rx antenna between PRS occasions (e.g., the Rx antenna associated with the best measurement), and report the measurement for the selected Rx antenna to the network. However, the network may not know which group delay to associate with the reported measurement because the network may not know the Rx antenna associated with the particular reported measurement (and even if the network knows the Rx antenna, the network may not know the current group delay, calibration status and/or timing error for that Rx antenna).

Now consider the case with respect to FR2 where the UE is provisioned with multiple panels to commute PRS measurements. Each panel may have its own characteristics, such as group delay, timing error, calibration error, and so on. For a given time, one panel may be calibrated with another panel may not be calibrated. Consider the case where the UE includes two panel P1 and P2, which will lead to 4 different possible panel selection scenarios, e.g.: panel selection.

P1 for receiving PRS and P1 transmitting SRS.

P1 for receiving PRS and P2 transmitting SRS.

P2 for receiving PRS and P1 transmitting SRS.

P2 for receiving PRS and P2 transmitting SRS.

The network may not know which group delay to associate with the reported measurement because the network may not know the panel associated with the particular reported measurement (and even if the network knows the panel, the network may not know the current group delay, calibration status and/or timing error for that panel).

Aspects of the disclosure are directed to determining timing information, such as a transmit or receive hardware group delay, timing error, timing calibration error, or a combination thereof. For example, the timing information may be associated with a set of hardware components (e.g., associated with particular receiver(s), panel(s), etc.) of a wireless node (e.g., UE or BS). The timing information can be associated with one of a plurality of timing groups. An indication of the respective timing group can be reported to a position estimation entity to facilitate position estimation for a UE. Such aspects may provide various technical advantages, such as improved positioning for the UE. Also, by indicating the timing group, the position estimation entity need not know the specific hardware component(s) (e.g., the particular receiver(s), panel(s), etc.) associated with a measurement, but rather the timing group so that appropriate timing modification (e.g., correction) can be implemented.

Figure 11:
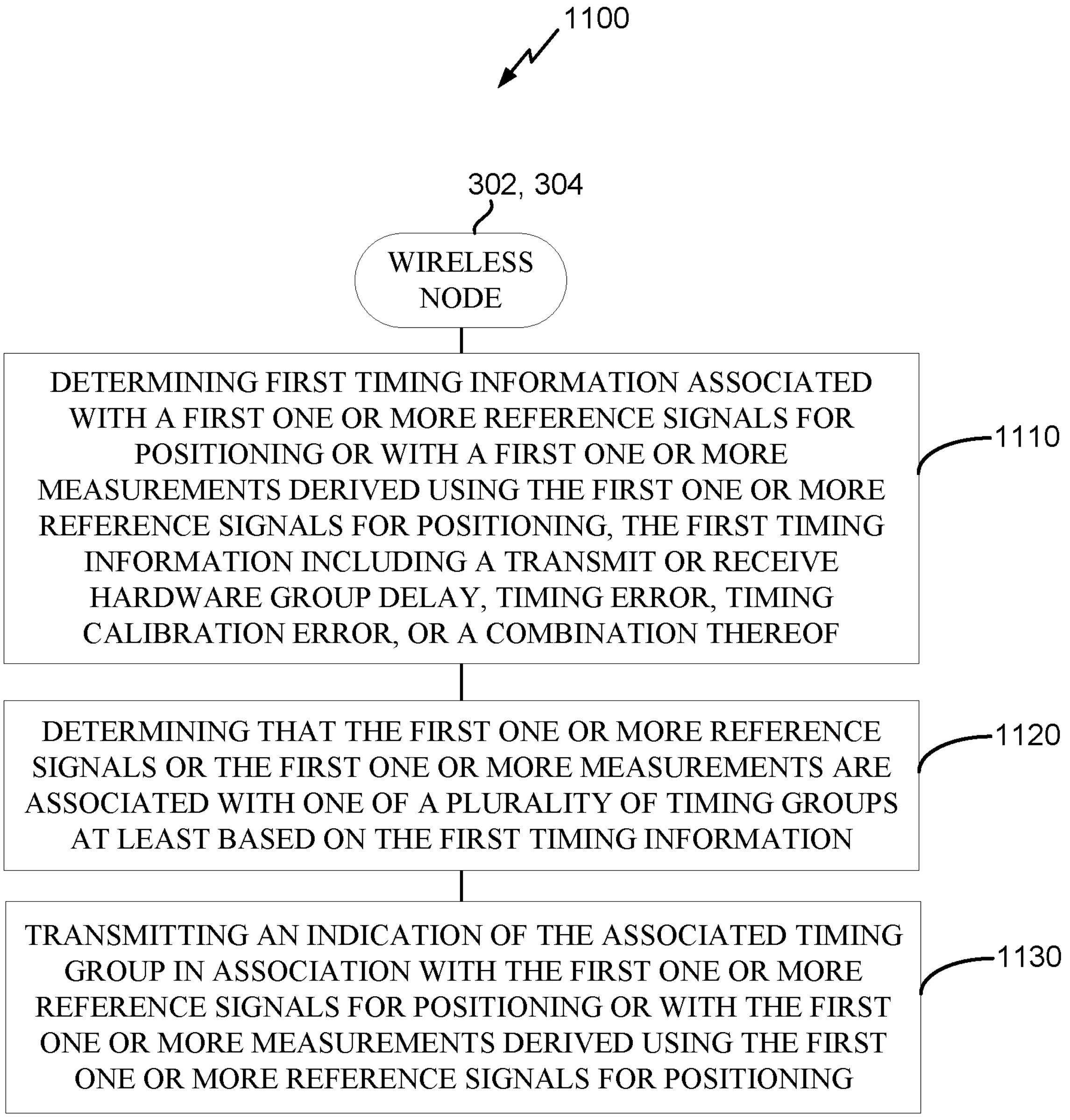
FIG. 11 illustrates an exemplary process of wireless communication, according to aspects of the disclosure.

FIG. 11 illustrates an exemplary process 1100 of wireless communication, according to aspects of the disclosure. In an aspect, the process 1100 may be performed by a wireless node, such as UE 302 or BS 304.

At 1110, the wireless node (e.g., receiver 312 or 322 or 352 or 362, transmitter 314 or 324 or 354 or 364, processing system 332 or 384, positioning measurement module 342 or 388, etc.) determines first timing information associated with a first one or more reference signals for positioning or with a first one or more measurements derived using the first one or more reference signals for positioning, the first timing information including a transmit or receive hardware group delay, timing error, timing calibration error, or a combination thereof. As will be described in more detail below, the first timing information may be associated with various internal components of the wireless node, such as receiver(s), transmitter(s), panel(s), etc. of the wireless node. In some designs, the first timing information may be refreshed or re-calibrated either periodically or in an event-triggered manner.

At 1120, the wireless node (e.g., processing system 332 or 384, positioning measurement module 342 or 388, etc.) determines that the first one or more reference signals or the first one or more measurements are associated with one of a plurality of timing groups at least based on the first timing information. As will be discussed in more detail below, the plurality of timing groups may be associated with different measurement types, such as an Rx measurement group (RMG) for timing correction of Rx reference signal measurements at the wireless node, a Tx measurement group (TMG) for timing correction of Tx signals transmitted by the wireless node and measured at another wireless node, and an Rx-Tx measurement group (RTMG) for timing correction of Rx-Tx measurements at the wireless node.

At 1130, the wireless node (e.g., transmitter 314 or 324 or 354 or 364, processing system 332 or 384, network interface(s) 380, data bus 382, etc.) transmits an indication of the associated timing group in association with the first one or more reference signals for positioning or with the first one or more measurements (e.g., raw measurement data, feature(s) extracted from the raw measurement data, etc.) derived using the first one or more reference signals for positioning. In a scenario where the wireless node corresponds to UE 302, the indication at 1130 may be transmitted to a network component such as LMF 306. In a scenario where the wireless node corresponds to BS 304, the indication at 1130 may be transmitted to UE 302 (e.g., for UE-based positioning) or a network component such as LMF 306, or may correspond to an internal transmission from one logical component of BS 304 to another logical component of BS 304 (e.g., via data bus 382) in a scenario where the LMF is integrated with BS 304.

Figure 12:
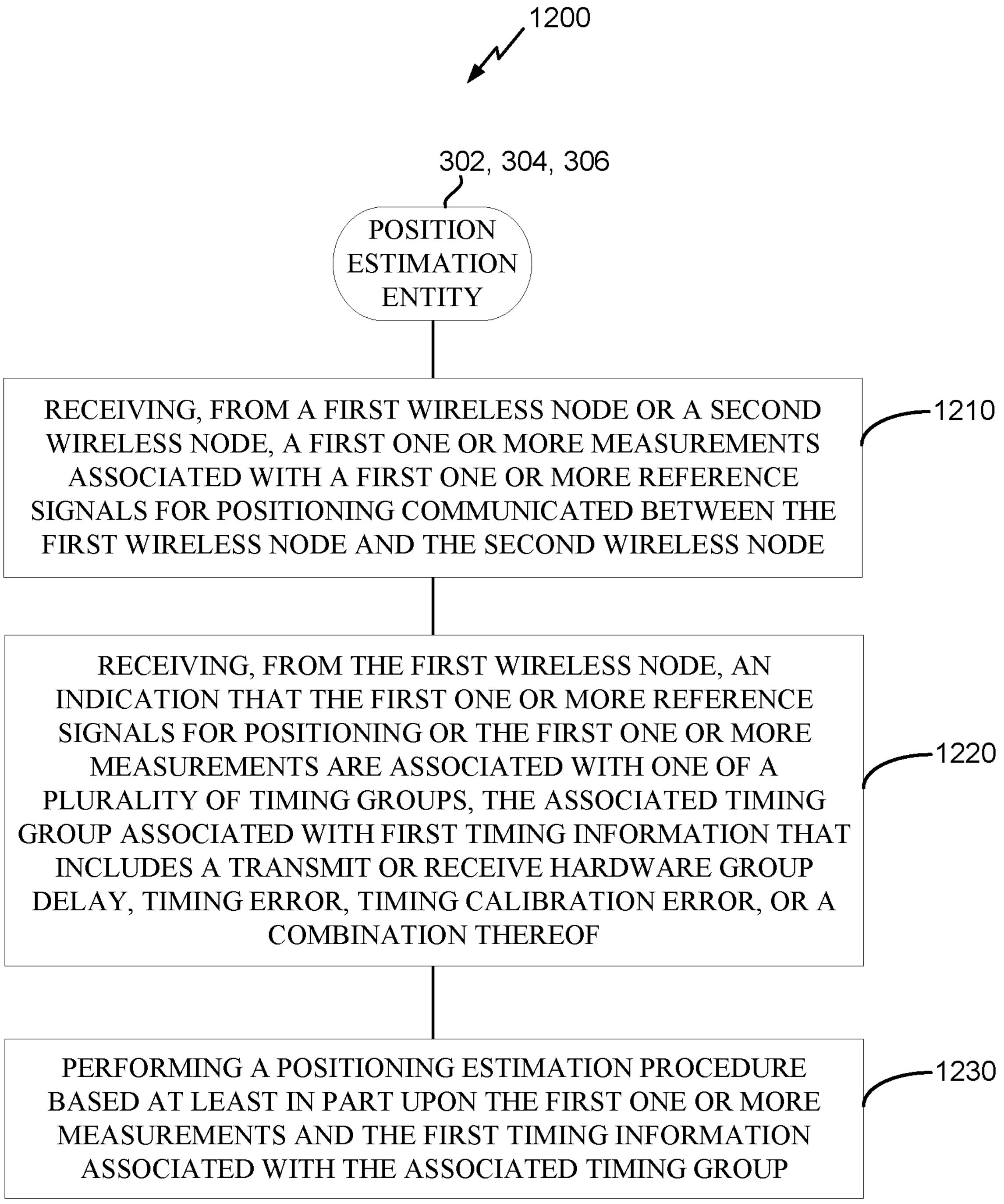
FIG. 12 illustrates an exemplary process of wireless communication, according to aspects of the disclosure.

FIG. 12 illustrates an exemplary process 1200 of wireless communication, according to aspects of the disclosure. In an aspect, the process 1200 may be performed by a position estimation entity, such as UE 302, LMF 306, or BS 304 (e.g., in a scenario where the LMF is integrated with BS 304).

At 1210, the position estimation entity (e.g., receiver 312 or 322 or 352 or 362, transmitter 314 or 324 or 354 or 364, processing system 332 or 384, network interface(s) 380, data buses 382, data bus 392, etc.) receives, from a first wireless node or a second wireless node, a first one or more measurements (e.g., raw measurement data, feature(s) extracted from the raw measurement data, etc.) associated with a first one or more reference signals for positioning communicated between the first wireless node and the second wireless node. In some designs, the first wireless node may correspond to UE 302 and the second wireless node may correspond to BS 304, while in other designs the first wireless node may correspond to BS 304 and the second wireless node may correspond to UE 302. In other designs, both the first wireless node and the second wireless node may correspond to UEs (e.g., if one of the UEs has a known location and is acting as a BS for position estimation) or BSs (e.g., for BS-to-BS timing calibration).

At 1220, the position estimation entity (e.g., receiver 312 or 322 or 352 or 362, transmitter 314 or 324 or 354 or 364, processing system 332 or 384, network interface(s) 380, data buses 382, data bus 392, etc.) receives, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof.

At 1230, the position estimation entity (e.g., processing system 332 or 384, positioning measurement module 342, 388 or 389, etc.) performs a positioning estimation procedure based at least in part upon the first one or more measurements and the first timing information associated with the associated timing group.

Referring to FIGS. 11-12, in some designs, the wireless node (e.g., first wireless node) may further determine second timing information associated with a second one or more reference signals for positioning or with a second one or more measurements derived using the second one or more reference signals for positioning, the second timing information being different than the first timing information. The wireless node may further determine that the second one or more reference signals or the second one or more measurements are associated with the same timing group as the first one or more reference signals or the first one or more measurements based on the first timing information and the second timing information falling within a respective timing information range (e.g., transmit or receive hardware group delay range, timing error range, timing calibration error range, etc.). In some designs, the respective timing information range may be defined as an absolute range (e.g., 1-5 ns, 50 ns-250 ns, 100 ns-500 ns, etc.). In other designs, the respective timing information range may be defined as a timing margin. In other designs, the wireless node may determine that the second one or more reference signals or the second one or more measurements are associated with the same timing group as the first one or more reference signals or the first one or more measurements based on the first timing information and the second timing information being the same. In either case, the wireless node (e.g., first wireless node) may then send a second indication to the position estimation entity of the timing group that the second one or more reference signals for positioning or the second one or more measurements are associated with the same timing group as the first one or more reference signals or the first one or more measurements.

Referring to FIGS. 11-12, in some designs, the plurality of timing groups may comprise a set of RMGs. In some designs, each RMG in the set of RMGs may be associated with different timing information. In an example, the wireless node may report an Rx measurement (e.g., Rx-Tx, RSTD, TOA, etc.) along with the RMG to which the measurement belongs. In an example, the wireless node may report the RMG associated with the PRS resources IDs and/or PRS resource set IDs or SRS resources IDs and/or SRS resource set IDs used for timing measurement(s). The set of RMGs may include multiple RMGs depending on the hardware group delay(s), timing error(s), and/or calibration error(s) of specific wireless node components associated with the measurement(s), which may be denoted as RMG1, RMG2 . . . RMGX. For example, all the measurements reported under the same Xth RMG will have same Rx timing or Rx timing error in the measurement. As used herein, "same Rx timing" may be quantified with smaller range of Rx timing differences between the measurements, compared to the case that the measurements do not belong to the same RMG. For measurements belonging to different RMGs, the LMF cannot assume that the Rx timing or Rx timing error is the same.

Referring to FIGS. 11-12, in some designs with respect to RMGs, the first one or more reference signals for positioning may include one or more Rx reference signals for positioning received at the wireless node. In some designs, the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning. In some designs, the one or more Rx reference signals for positioning comprise first and second Rx reference signals for positioning configured in different frequency layers or different bands or different Frequency Ranges (FRs) are associated with the same timing group. In some designs, the first Rx reference signal for positioning is a QCL source or target or a spatial relation reference for the second Rx reference signal for positioning. In some designs, the wireless node may perform the first one or more measurements associated with the one or more Rx reference signals for positioning, and may transmit a measurement report based on the first one or more measurements. In some designs, the first one or more measurements comprise one or more timing measurements (e.g., a time of arrival (ToA) measurement, a received signal time difference (RSTD) measurement, or an receive-transmit (Rx-Tx) measurement). In some designs, the indication at 1130 of FIG. 11 or 1220 of FIG. 12 may include a respective indication of a respective timing group associated with each measurement in the measurement report. In some designs, multiple measurements associated with the same receive beam index are also associated with the same timing group. In this case, an indication of the receive beam index may function as an indication of the timing group (e.g., a separate timing group indication may not be needed). In some designs, the indication at 1130 of FIG. 11 or 1220 of FIG. 12 may include a single-bit indication that indicates whether all measurements in the measurement report are associated with the same timing group.

Referring to FIGS. 11-12, in some designs with respect to RMGs, the first one or more measurements may include a first measurement associated with a first path of a respective Rx reference signal for positioning and a second measurement associated with a second path of the respective Rx reference signal for positioning. In an example, the first measurement and the second measurement are associated with the same timing group based on the first measurement and the second measurement being associated with different paths of the same respective Rx reference signal for positioning.

Referring to FIGS. 11-12, in some designs with respect to RMGs, the wireless node may correspond to UE 302 and the one or more Rx reference signals for positioning may include a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof.

Referring to FIGS. 11-12, in some designs with respect to RMGs, the wireless node may correspond to BS 304, and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Referring to FIGS. 11-12, in some designs, the plurality of timing groups may comprise a set of TMGs. In some designs, each TMG in the set of TMGs may be associated with different timing information. In an example, the wireless node may report timing correction for Tx measurements (e.g., UL or SL TOA if the wireless node corresponds to UE 302, DL TOA if the wireless node corresponds to BS 304, etc.). The set of TMGs may include multiple TMGs depending on the hardware group delay(s), timing error(s), and/or calibration error(s) of specific wireless node components associated with the Tx reference signals, which may be denoted as TMG1, TMG2 . . . TMGX. For example, for each timing measurement of a Tx reference signal associated with the same TMG, the LMF may assume that the same hardware group delay, timing error and/or calibration error is involved. In some designs, measurements that belong to different TMGs are associated with different hardware group delay, timing error and/or calibration error and will be assumed to have different timing correction. For measurements belonging to different TMGs, the LMF cannot assume that the Tx timing or Tx timing error is the same.

Referring to FIGS. 11-12, in some designs with respect to TMGs, the first one or more reference signals may include one or more transmit (Tx) reference signals for positioning. In some designs, the one or more Tx reference signals for positioning may include a first Tx reference signal for positioning and a second Tx reference signal for positioning associated with the same timing group based on the first Tx reference signal for positioning being a quasi-colocation (QCL) source or target or spatial relation reference for the second Tx reference signal for positioning. In some designs, the wireless node may transmit the Tx reference signal for positioning. In this case, the Tx reference signal for positioning is measured by another wireless node, with that measurement being corrected at the position estimation entity based on the associated timing group from the wireless node.

Referring to FIGS. 11-12, in some designs with respect to TMGs, the wireless node may correspond to UE 302, and the Tx reference signal for positioning may include an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof.

Referring to FIGS. 11-12, in some designs with respect to TMGs, the wireless node may correspond to BS 304, and the Tx reference signal for positioning may include a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Referring to FIGS. 11-12, in some designs, the plurality of timing groups may comprise a set of RTMGs. In some designs, each RTMG in the set of RTMGs may be associated with different timing information for Rx-Tx-specific measurements, such as multi-cell RTT. The set of RTMGs may include multiple RTMGs depending on the hardware capabilities, timing errors, and/or calibration errors of specific wireless node components associated with the Rx-Tx measurement(s), which may be denoted as RTMG1, RTMG2 . . . RTMGX. For example, for each Rx-Tx measurement associated with the same RTMG, the LMF may assume that the same hardware group delay, timing error and/or calibration error is involved. In some designs, measurements that belong to different RTMGs are associated with different hardware group delay, timing error and/or calibration error and will be assumed to have different timing correction. For measurements belonging to different RTMGs, the LMF cannot assume that the Tx timing or Tx timing error is the same.

Referring to FIGS. 11-12, in some designs with respect to RTMGs, the first one or more reference signals may include a receive (Rx) reference signal for positioning and a transmit (Tx) reference signal for positioning. In some designs, the wireless node may perform the first one or more measurements associated with the Rx reference signal for positioning and the Tx reference signal for positioning (e.g., ToA measurement of Rx reference signal and time of transmission of Tx reference signal), and may transmit a measurement report based on the first one or more measurements (e.g., Rx-Tx measurement).

Referring to FIGS. 11-12, in some designs with respect to RTMGs, the wireless node may correspond to UE 302, and the one or more Tx reference signals for positioning may include a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Referring to FIGS. 11-12, in some designs with respect to RTMGs, the wireless node may correspond to BS 304 and the one or more Tx reference signals for positioning may include the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

Referring to FIGS. 11-12, in some designs, in an example where the wireless node corresponds to UE 302, various types of measurements may be reported to the LMF, including one or more of:

nr-DL-PRS-RSRP-Result
nr-DL-PRS-RSRQ-Result
nr-DL-TDOA-AdditionalMeasurements
nr-Multi-RTT-AdditionalMeasurements-r16
nr-DL-PRS-RxBeamIndex-r16
nr-DL-AoD-AdditionalMeasurements-r16.

These measurements types may be mapped to timing group types as shown in Table 3:

TABLE 3

Timing Group Table for UE

| Timing Group Type | Measurement Types |
|---|---|
| RMG | DL TDOA, DL RSTD (PRS), UE AoA |
| TMG | UL TDOA, UL RSTD (SRS), UE AoD |
| RTMG | Multi-cell RTT |

It will be appreciated that a similar mapping of timing groups to measurement types may carry over to gNB as well in scenario where the wireless node corresponds to BS 304 rather than UE 302.

In some designs, for each measurement report, the wireless node may specify which RMG, TMG and/or RTMG is associated with a particular measurement. For example, consider a differential measurement between a reference cell and a measured (non-reference) cell. In this case, a first optional information element (IE) denoted as nr-UE-measurement-group-ref may specify one of 8 groups (X=8) for RMG, TMG or RTMG of the reference cell, and a second optional IE denoted as nr-UE-measurement-group may specify one of 8 groups (X=8) for RMG, TMG or RTMG of the measured (non-reference) cell. The LMF can then lookup the timing corrections associated with the indicated groups to adjust the respective measurements for the position estimation. In this case, the RMG/TMG/RTMG indication is integrated into the measurement report. However, in other designs, the RMG/TMG/RTMG indication need not be integrated but can be conveyed separately. For example, the indication can be transmitted in a time-based (e.g., periodic) or event-based manner. For example, the wireless node can track the timing information (e.g., of a particular set of hardware components) of the wireless node over time, and update the RMG/TMG/RTMG indication if any drift is detected beyond a threshold. Alternatively, if the wireless node switches to different panels for Rx or Tx operations and this results in a change to RMG/TMG/RTMG, an updated RMG/TMG/RTMG indication may be triggered.

Referring to FIGS. 11-12, in some designs, the determined timing information may match respective timing information of a timing group by corresponding to a particular hardware group delay, a particular timing error, a particular calibration error, or a combination thereof, for that timing group. In other designs, the determined timing information matches respective timing information of a timing group by falling within a hardware group delay range, a timing error range, a calibration error range, or a combination thereof, for that timing group. For example, assume that a particular timing group may have a hardware group delay range, timing error range and/or calibration error range of 4-6 ns. In this case, measurements or transmissions of reference signal(s) with associated with hardware component(s) in this error range will belong to this timing group. In an example, the timing correction applied by the position estimation entity may somewhere between 4-6 ns (e.g., a group average such as 5 ns, or a weighted average).

Referring to FIGS. 11-12, in a specific example, assume that the wireless node corresponds to UE 302 and SRS is configured by the LMF/gNB. The UE transmits the SRS based on the configuration and provides SFN. The UE does not transmit anything specific to SRS in the measurement report. In one example, a new signaling can be defined in the measurement report to report the TMG ID for SRS (e.g., in cases PRS or DL measurement is scheduled). In another example, a new independent signaling can be defined to transmit SRS TMG ID (e.g., in case PRS or DL measurement is not scheduled). In an example, the new independent signaling may be implemented similar to a capability transfer request or any other lower layer signaling (e.g., MAC-CE, uplink control indication (UC) communication, etc.).

Referring to FIGS. 11-12, in some designs, UE 302 may transmit a timing group reporting capability indication to the position estimation entity that indicates a capability of the UE to report information related to timing groups (e.g., TxTEG, RxTEG, RxTxTEG, RMG, TMG, etc.).

Referring to FIGS. 11-12, in some designs, the plurality of timing groups may include 8 RMGs denoted as RMG1, RMG2, . . . , RMG8, 8 TMGs denoted as TMG1, TMG2, . . . , TMG8, and 8 RTMGs denoted as RTMG1, RTMG2, . . . , RTMG8. In some designs, the respective timing groups may be organized into a table where each respective timing group is associated with a respective maximum timing offset that specifies a maximum timing offset to be assumed by a network component (e.g., for positioning estimation by a position estimation entity) for each respective timing group. In some designs, the respective maximum timing offset may be defined between the respective timing group and one or more adjacent timing groups (e.g., RMG-to-RX TEG, TMG-to-TX TEG, etc.). The table is reported by the wireless node to the network component (e.g., position estimation entity, LMF, gNB, etc.). The maximum timing offsets in the table can be updated on a periodic basis, an event-triggered basis (e.g., whenever a change to a respective maximum timing offset for a timing group exceeds a threshold from a previously reported value), or a combination thereof, and then reported to the network component (e.g., position estimation entity). In some designs, one or more timer validity tags that each indicates or is associated with a validity time for one or more parameters associated with the indication of the associated timing group (e.g., a validity tag for a respective maximum timing offset can also be reported by the wireless node to the network component, such as position estimation entity). For example, the difference the reporting may include (or may specify) the validity time(s) inside the report, or alternatively the validity time(s) may be predetermined or fixed (e.g., when the UE reports, there is a max timer for which this information is valid).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a wireless node, comprising: determining first timing information associated with a first one or more reference signals for positioning or with a first one or more measurements derived using the first one or more reference signals for positioning, the first timing information including a transmit or receive hardware group delay, timing error, timing calibration error, or a combination thereof; determining that the first one or more reference signals or the first one or more measurements are associated with one of a plurality of timing groups at least based on the first timing information; and transmitting an indication of the associated timing group in association with the first one or more reference signals for positioning or with the first one or more measurements derived using the first one or more reference signals for positioning.

Clause 2. The method of clause 1, wherein the first timing information is associated with a set of hardware components of the first wireless node.

Clause 3. The method of any of clauses 1 to 2, further comprising: determining second timing information associated with a second one or more reference signals for positioning or with a second one or more measurements derived using the second one or more reference signals for positioning, the second timing information being different than the first timing information; and determining that the second one or more reference signals or the second one or more measurements are associated with the same timing group as the first one or more reference signals or the first one or more measurements based on the first timing information and the second timing information falling within a respective timing information range.

Clause 4. The method of any of clauses 1 to 3, further comprising: determining second timing information associated with a second one or more reference signals for positioning or with a second one or more measurements derived using the second one or more reference signals for positioning, the second timing information being the same as the first timing information; and determining that the second one or more reference signals or the second one or more measurements are associated with the same timing group as the first one or more reference signals or the first one or more measurements based on the first timing information and the second timing information being the same.

Clause 5. The method of any of clauses 1 to 4, wherein the first timing information matches respective timing information of the associated timing group by corresponding to a particular transmit or receive hardware group delay, a particular timing error, a particular timing calibration error, or a combination thereof, or wherein the first timing information matches the respective timing information of the associated timing group by falling within a transmit or receive hardware group delay range, a timing error range, a timing calibration error range, or a combination thereof.

Clause 6. The method of any of clauses 1 to 5, wherein the first one or more reference signals for positioning include one or more receive (Rx) reference signals for positioning received at the wireless node.

Clause 7. The method of clause 6, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 8. The method of any of clauses 6 to 7, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 9. The method of clause 8, wherein the first Rx reference signal for positioning is a quasi-colocation (QCL) source or target or a spatial relation reference for the second Rx reference signal for positioning.

Clause 10. The method of any of clauses 6 to 9, further comprising: performing the first one or more measurements associated with the first one or more reference signals for positioning; and transmitting a measurement report based on the first one or more measurements.

Clause 11. The method of clause 10, wherein the first one or more measurements comprise one or more timing measurements.

Clause 12. The method of clause 11, wherein the one or more timing measurements comprise a time of arrival (ToA) measurement, a received signal time difference (RSTD) measurement, or an receive-transmit (Rx-Tx) measurement.

Clause 13. The method of any of clauses 10 to 12, wherein the indication of the associated timing group comprises a respective indication of a respective timing group associated with each measurement in the measurement report.

Clause 14. The method of any of clauses 10 to 13, wherein multiple measurements associated with the same receive beam index are also associated with the same timing group.

Clause 15. The method of any of clauses 10 to 14, wherein the measurement report includes a single-bit indication that indicates whether all measurements in the measurement report are associated with the same timing group.

Clause 16. The method of any of clauses 10 to 15, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 17. The method of any of clauses 6 to 16, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 18. The method of any of clauses 1 to 17, wherein the first one or more reference signals include one or more transmit (Tx) reference signals for positioning.

Clause 19. The method of clause 18, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 20. The method of any of clauses 18 to 19, further comprising: transmitting the one or more Tx reference signals for positioning.

Clause 21. The method of any of clauses 18 to 20, wherein the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 22. The method of any of clauses 1 to 21, wherein the first one or more reference signals include a receive (Rx) reference signal for positioning and a transmit (Tx) reference signal for positioning.

Clause 23. The method of clause 22, further comprising: performing the first one or more measurements in association with the Rx reference signal for positioning and the Tx reference signal for positioning; and transmitting a measurement report based on the first one or more measurements.

Clause 24. The method of any of clauses 22 to 23, wherein the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

Clause 25. The method of any of clauses 1 to 24, wherein the wireless node corresponds to a user equipment (UE), further comprising: transmitting a measurement report associated with the first one or more reference signals.

Clause 26. The method of clause 25, wherein the indication is integrated with the measurement report or separate from the measurement report.

Clause 27. The method of any of clauses 1 to 26, wherein the indication is transmitted in a time-based or event-based manner.

Clause 28. The method of any of clauses 1 to 27, wherein the first one or more reference signals for positioning comprise a first reference signal for positioning and a second reference signal for positioning associated with a differential positioning measurement, and wherein the transmitting transmits a first indication of a first timing group associated with the first reference signal for positioning and a second indication of a second timing group associated with the second reference signal for positioning.

Clause 29. The method of any of clauses 1 to 28, wherein the plurality of timing groups is associated with a respective maximum timing offset that specifies a maximum timing offset to be assumed by a network component for each respective timing group.

Clause 30. The method of clause 29, further comprising: updating the maximum timing offsets on a periodic basis, an event-triggered basis, or a combination thereof; and reporting the maximum timing offsets to the network component.

Clause 31. The method of any of clauses 1 to 30, wherein the reporting further comprises reporting one or more timer validity tags that each indicates or is associated with a validity time for one or more parameters associated with the indication of the associated timing group.

Clause 32. A method of operating a position estimation entity, comprising: receiving, from a first wireless node or a second wireless node, a first one or more measurements associated with a first one or more reference signals for positioning communicated between the first wireless node and the second wireless node; receiving, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and performing a positioning estimation procedure based at least in part upon the first one or more measurements and the first timing information associated with the associated timing group.

Clause 33. The method of clause 32, wherein the first timing information is associated with a set of hardware components of the first wireless node.

Clause 34. The method of any of clauses 32 to 33, further comprising: receiving, from the first wireless node, a second one or more measurements associated with a second one or more reference signals for positioning; and receiving, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

Clause 35. The method of any of clauses 32 to 34, further comprising: receiving, from the first wireless node, a second one or more measurements associated with a second one or more reference signals for positioning; and receiving, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

Clause 36. The method of any of clauses 32 to 35, wherein the positioning estimation procedure is performed with respect to a user equipment (UE) that corresponds to either the first wireless node or the second wireless node.

Clause 37. The method of any of clauses 32 to 36, wherein the first timing information matches respective timing information of the associated timing group by corresponding to a particular transmit or receive hardware group delay, a particular timing error, a particular calibration error, or a combination thereof, or wherein the first timing information matches the respective timing information of the associated timing group by falling within a transmit or receive hardware group delay range, a timing error range, a timing calibration error range, or a combination thereof.

Clause 38. The method of any of clauses 32 to 37, wherein the first one or more reference signals for positioning include one or more receive (Rx) reference signals for positioning received at the first wireless node.

Clause 39. The method of clause 38, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 40. The method of any of clauses 38 to 39, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 41. The method of clause 40, wherein the first Rx reference signal for positioning is a quasi-colocation (QCL) source or target or a spatial relation reference for the second Rx reference signal for positioning.

Clause 42. The method of any of clauses 38 to 41, wherein the first one or more measurements are received in a measurement report.

Clause 43. The method of clause 42, wherein the first one or more measurements comprise one or more timing measurements.

Clause 44. The method of clause 43, wherein the one or more timing measurements comprise a time of arrival (ToA) measurement, a received signal time difference (RSTD) measurement, or an receive-transmit (Rx-Tx) measurement.

Clause 45. The method of any of clauses 42 to 44, wherein a respective indication of a respective timing group associated with each of the first one or more measurements is received.

Clause 46. The method of any of clauses 42 to 45, wherein multiple measurements associated with the same receive beam index are also associated with the same timing group.

Clause 47. The method of any of clauses 42 to 46, wherein a single-bit indication indicates whether all measurements in the measurement report are associated with the same timing group.

Clause 48. The method of any of clauses 42 to 47, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 49. The method of any of clauses 38 to 48, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 50. The method of any of clauses 32 to 49, wherein the first one or more reference signals include one or more transmit (Tx) reference signals for positioning that are transmitted from the first wireless node.

Clause 51. The method of clause 50, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 52. The method of any of clauses 50 to 51, wherein the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 53. The method of any of clauses 32 to 52, wherein the first one or more reference signals include a receive (Rx) reference signal for positioning and a transmit (Tx) reference signal for positioning.

Clause 54. The method of clause 53, wherein the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

Clause 55. The method of any of clauses 32 to 54, wherein the indication is integrated with a measurement report comprising the first one or more measurements or separate from the measurement report.

Clause 56. The method of any of clauses 32 to 55, wherein the indication is received in a time-based or event-based manner.

Clause 57. The method of any of clauses 32 to 56, wherein the first one or more reference signals for positioning comprise a first reference signal for positioning and a second reference signal for positioning associated with a differential positioning measurement, and wherein a first indication of a first timing group associated with the first reference signal for positioning is received and a second indication of a second timing group associated with the second reference signal for positioning is received.

Clause 58. The method of any of clauses 32 to 57, wherein the plurality of timing groups is associated with a respective maximum timing offset that specifies a maximum timing offset to be assumed for positioning estimation by the position estimation entity for each respective timing group.

Clause 59. The method of clause 58, further comprising: receiving a report that indicates an update to the maximum timing offsets on a periodic basis, an event-triggered basis, or a combination thereof.

Clause 60. The method of clause 59, wherein the report further indicates one or more timer validity tags that each indicates or is associated with a validity time for one or more parameters associated with the indication of the associated timing group.

Clause 61. A wireless node, comprising: a memory; at least one transceiver; and at least one processor communicatively coupled to the memory and the at least one transceiver, the at least one processor configured to: determine first timing information associated with a first one or more reference signals for positioning or with a first one or more measurements derived using the first one or more reference signals for positioning, the first timing information including a transmit or receive hardware group delay, timing error, timing calibration error, or a combination thereof; determine that the first one or more reference signals or the first one or more measurements are associated with one of a plurality of timing groups at least based on the first timing information; and transmit, via the at least one transceiver, an indication of the associated timing group in association with the first one or more reference signals for positioning or with the first one or more measurements derived using the first one or more reference signals for positioning.

Clause 62. The wireless node of clause 61, wherein the first timing information is associated with a set of hardware components of the first wireless node.

Clause 63. The wireless node of any of clauses 61 to 62, wherein the at least one processor is further configured to: determine second timing information associated with a second one or more reference signals for positioning or with a second one or more measurements derived using the second one or more reference signals for positioning, the second timing information being different than the first timing information; and determine that the second one or more reference signals or the second one or more measurements are associated with the same timing group as the first one or more reference signals or the first one or more measurements based on the first timing information and the second timing information falling within a respective timing information range.

Clause 64. The wireless node of any of clauses 61 to 63, wherein the at least one processor is further configured to: determine second timing information associated with a second one or more reference signals for positioning or with a second one or more measurements derived using the second one or more reference signals for positioning, the second timing information being the same as the first timing information; and determine that the second one or more reference signals or the second one or more measurements are associated with the same timing group as the first one or more reference signals or the first one or more measurements based on the first timing information and the second timing information being the same.

Clause 65. The wireless node of any of clauses 61 to 64, wherein the first timing information matches respective timing information of the associated timing group by corresponding to a particular transmit or receive hardware group delay, a particular timing error, a particular timing calibration error, or a combination thereof, or wherein the first timing information matches the respective timing information of the associated timing group by falling within a transmit or receive hardware group delay range, a timing error range, a timing calibration error range, or a combination thereof.

Clause 66. The wireless node of any of clauses 61 to 65, wherein the first one or more reference signals for positioning include one or more receive (Rx) reference signals for positioning received at the wireless node.

Clause 67. The wireless node of clause 66, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 68. The wireless node of any of clauses 66 to 67, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 69. The wireless node of clause 68, wherein the first Rx reference signal for positioning is a quasi-colocation (QCL) source or target or a spatial relation reference for the second Rx reference signal for positioning.

Clause 70. The wireless node of any of clauses 66 to 69, wherein the at least one processor is further configured to: perform the first one or more measurements associated with the first one or more reference signals for positioning; and transmit, via the at least one transceiver, a measurement report based on the first one or more measurements.

Clause 71. The wireless node of clause 70, wherein the first one or more measurements comprise one or more timing measurements.

Clause 72. The wireless node of clause 71, wherein the one or more timing measurements comprise a time of arrival (ToA) measurement, a received signal time difference (RSTD) measurement, or an receive-transmit (Rx-Tx) measurement.

Clause 73. The wireless node of any of clauses 70 to 72, wherein the indication of the associated timing group comprises a respective indication of a respective timing group associated with each measurement in the measurement report.

Clause 74. The wireless node of any of clauses 70 to 73, wherein multiple measurements associated with the same receive beam index are also associated with the same timing group.

Clause 75. The wireless node of any of clauses 70 to 74, wherein the measurement report comprises a single-bit indication that indicates whether all measurements in the measurement report are associated with the same timing group.

Clause 76. The wireless node of any of clauses 70 to 75, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 77. The wireless node of any of clauses 66 to 76, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 78. The wireless node of any of clauses 61 to 77, wherein the first one or more reference signals include one or more transmit (Tx) reference signals for positioning.

Clause 79. The wireless node of clause 78, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 80. The wireless node of any of clauses 78 to 79, wherein the at least one processor is further configured to: transmit, via the at least one transceiver, the one or more Tx reference signals for positioning.

Clause 81. The wireless node of any of clauses 78 to 80, wherein the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 82. The wireless node of any of clauses 61 to 81, wherein the first one or more reference signals include a receive (Rx) reference signal for positioning and a transmit (Tx) reference signal for positioning.

Clause 83. The wireless node of clause 82, wherein the at least one processor is further configured to: perform the first one or more measurements in association with the Rx reference signal for positioning and the Tx reference signal for positioning; and transmit, via the at least one transceiver, a measurement report based on the first one or more measurements.

Clause 84. The wireless node of any of clauses 82 to 83, wherein the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

Clause 85. The wireless node of any of clauses 61 to 84, wherein the wireless node corresponds to a user equipment (UE), further comprising: transmit, via the at least one transceiver, a measurement report associated with the first one or more reference signals.

Clause 86. The wireless node of clause 85, wherein the indication is integrated with the measurement report or separate from the measurement report.

Clause 87. The wireless node of any of clauses 61 to 86, wherein the indication is transmitted in a time-based or event-based manner.

Clause 88. The wireless node of any of clauses 61 to 87, wherein the first one or more reference signals for positioning comprise a first reference signal for positioning and a second reference signal for positioning associated with a differential positioning measurement, and wherein the transmitting transmits a first indication of a first timing group associated with the first reference signal for positioning and a second indication of a second timing group associated with the second reference signal for positioning.

Clause 89. The wireless node of any of clauses 61 to 88, wherein the plurality of timing groups is associated with a respective maximum timing offset that specifies a maximum timing offset to be assumed by a network component for each respective timing group.

Clause 90. The wireless node of clause 89, wherein the at least one processor is further configured to: update the maximum timing offsets on a periodic basis, an event-triggered basis, or a combination thereof; and report the maximum timing offsets to the network component.

Clause 91. The wireless node of any of clauses 61 to 90, wherein the reporting further comprises reporting one or more timer validity tags that each indicates or is associated with a validity time for one or more parameters associated with the indication of the associated timing group.

Clause 92. A position estimation entity, comprising: a memory; at least one transceiver; and at least one processor communicatively coupled to the memory and the at least one transceiver, the at least one processor configured to: receive, via the at least one transceiver, from a first wireless node or a second wireless node, a first one or more measurements associated with a first one or more reference signals for positioning communicated between the first wireless node and the second wireless node; receive, via the at least one transceiver, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and perform a positioning estimation procedure based at least in part upon the first one or more measurements and the first timing information associated with the associated timing group.

Clause 93. The position estimation entity of clause 92, wherein the first timing information is associated with a set of hardware components of the first wireless node.

Clause 94. The position estimation entity of any of clauses 92 to 93, wherein the at least one processor is further configured to: receive, via the at least one transceiver, from the first wireless node, a second one or more measurements associated with a second one or more reference signals for positioning; and receive, via the at least one transceiver, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

Clause 95. The position estimation entity of any of clauses 92 to 94, wherein the at least one processor is further configured to: receive, via the at least one transceiver, from the first wireless node, a second one or more measurements associated with a second one or more reference signals for positioning; and receive, via the at least one transceiver, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

Clause 96. The position estimation entity of any of clauses 92 to 95, wherein the positioning estimation procedure is performed with respect to a user equipment (UE) that corresponds to either the first wireless node or the second wireless node.

Clause 97. The position estimation entity of any of clauses 92 to 96, wherein the first timing information matches respective timing information of the associated timing group by corresponding to a particular transmit or receive hardware group delay, a particular timing error, a particular calibration error, or a combination thereof, or wherein the first timing information matches the respective timing information of the associated timing group by falling within a transmit or receive hardware group delay range, a timing error range, a timing calibration error range, or a combination thereof.

Clause 98. The position estimation entity of any of clauses 92 to 97, wherein the first one or more reference signals for positioning include one or more receive (Rx) reference signals for positioning received at the first wireless node.

Clause 99. The position estimation entity of clause 98, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 100. The position estimation entity of any of clauses 98 to 99, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 101. The position estimation entity of clause 100, wherein the first Rx reference signal for positioning is a quasi-colocation (QCL) source or target or a spatial relation reference for the second Rx reference signal for positioning.

Clause 102. The position estimation entity of any of clauses 98 to 101, wherein the first one or more measurements are received in a measurement report.

Clause 103. The position estimation entity of clause 102, wherein the first one or more measurements comprise one or more timing measurements.

Clause 104. The position estimation entity of clause 103, wherein the one or more timing measurements comprise a time of arrival (ToA) measurement, a received signal time difference (RSTD) measurement, or an receive-transmit (Rx-Tx) measurement.

Clause 105. The position estimation entity of any of clauses 102 to 104, wherein a respective indication of a respective timing group associated with each of the first one or more measurements is received.

Clause 106. The position estimation entity of any of clauses 102 to 105, wherein multiple measurements associated with the same receive beam index are also associated with the same timing group.

Clause 107. The position estimation entity of any of clauses 102 to 106, wherein a single-bit indication indicates whether all measurements in the measurement report are associated with the same timing group.

Clause 108. The position estimation entity of any of clauses 102 to 107, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 109. The position estimation entity of any of clauses 98 to 108, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 110. The position estimation entity of any of clauses 92 to 109, wherein the first one or more reference signals include one or more transmit (Tx) reference signals for positioning that are transmitted from the first wireless node.

Clause 111. The position estimation entity of clause 110, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 112. The position estimation entity of any of clauses 110 to 111, wherein the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 113. The position estimation entity of any of clauses 92 to 112, wherein the first one or more reference signals include a receive (Rx) reference signal for positioning and a transmit (Tx) reference signal for positioning.

Clause 114. The position estimation entity of clause 113, wherein the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

Clause 115. The position estimation entity of any of clauses 92 to 114, wherein the indication is integrated with a measurement report comprising the first one or more measurements or separate from the measurement report.

Clause 116. The position estimation entity of any of clauses 92 to 115, wherein the indication is received in a time-based or event-based manner.

Clause 117. The position estimation entity of any of clauses 92 to 116, wherein the first one or more reference signals for positioning comprise a first reference signal for positioning and a second reference signal for positioning associated with a differential positioning measurement, and wherein a first indication of a first timing group associated with the first reference signal for positioning is received and a second indication of a second timing group associated with the second reference signal for positioning is received.

Clause 118. The position estimation entity of any of clauses 92 to 117, wherein the plurality of timing groups is associated with a respective maximum timing offset that specifies a maximum timing offset to be assumed for positioning estimation by the position estimation entity for each respective timing group.

Clause 119. The position estimation entity of clause 118, further comprising: receiving a report that indicates an update to the maximum timing offsets on a periodic basis, an event-triggered basis, or a combination thereof.

Clause 120. The position estimation entity of clause 119, wherein the report further indicates one or more timer validity tags that each indicates or is associated with a validity time for one or more parameters associated with the indication of the associated timing group.

Clause 121. A wireless node, comprising: means for determining first timing information associated with a first one or more reference signals for positioning or with a first one or more measurements derived using the first one or more reference signals for positioning, the first timing information including a transmit or receive hardware group delay, timing error, timing calibration error, or a combination thereof; means for determining that the first one or more reference signals or the first one or more measurements are associated with one of a plurality of timing groups at least based on the first timing information; and means for transmitting an indication of the associated timing group in association with the first one or more reference signals for positioning or with the first one or more measurements derived using the first one or more reference signals for positioning.

Clause 122. The wireless node of clause 121, wherein the first timing information is associated with a set of hardware components of the first wireless node.

Clause 123. The wireless node of any of clauses 121 to 122, further comprising: means for determining second timing information associated with a second one or more reference signals for positioning or with a second one or more measurements derived using the second one or more reference signals for positioning, the second timing information being different than the first timing information; and means for determining that the second one or more reference signals or the second one or more measurements are associated with the same timing group as the first one or more reference signals or the first one or more measurements based on the first timing information and the second timing information falling within a respective timing information range.

Clause 124. The wireless node of any of clauses 121 to 123, further comprising: means for determining second timing information associated with a second one or more reference signals for positioning or with a second one or more measurements derived using the second one or more reference signals for positioning, the second timing information being the same as the first timing information; and means for determining that the second one or more reference signals or the second one or more measurements are associated with the same timing group as the first one or more reference signals or the first one or more measurements based on the first timing information and the second timing information being the same.

Clause 125. The wireless node of any of clauses 121 to 124, wherein the first timing information matches respective timing information of the associated timing group by corresponding to a particular transmit or receive hardware group delay, a particular timing error, a particular timing calibration error, or a combination thereof, or wherein the first timing information matches the respective timing information of the associated timing group by falling within a transmit or receive hardware group delay range, a timing error range, a timing calibration error range, or a combination thereof.

Clause 126. The wireless node of any of clauses 121 to 125, wherein the first one or more reference signals for positioning include one or more receive (Rx) reference signals for positioning received at the wireless node.

Clause 127. The wireless node of clause 126, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 128. The wireless node of any of clauses 126 to 127, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 129. The wireless node of clause 128, wherein the first Rx reference signal for positioning is a quasi-colocation (QCL) source or target or a spatial relation reference for the second Rx reference signal for positioning.

Clause 130. The wireless node of any of clauses 126 to 129, further comprising: means for performing the first one or more measurements associated with the first one or more reference signals for positioning; and means for transmitting a measurement report based on the first one or more measurements.

Clause 131. The wireless node of clause 130, wherein the first one or more measurements comprise one or more timing measurements.

Clause 132. The wireless node of clause 131, wherein the one or more timing measurements comprise a time of arrival (ToA) measurement, a received signal time difference (RSTD) measurement, or an receive-transmit (Rx-Tx) measurement.

Clause 133. The wireless node of any of clauses 130 to 132, wherein the indication of the associated timing group comprises a respective indication of a respective timing group associated with each measurement in the measurement report.

Clause 134. The wireless node of any of clauses 130 to 133, wherein multiple measurements associated with the same receive beam index are also associated with the same timing group.

Clause 135. The wireless node of any of clauses 130 to 134, wherein the measurement report comprises a single-bit indication that indicates whether all measurements in the measurement report are associated with the same timing group.

Clause 136. The wireless node of any of clauses 130 to 135, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 137. The wireless node of any of clauses 126 to 136, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 138. The wireless node of any of clauses 121 to 137, wherein the first one or more reference signals include one or more transmit (Tx) reference signals for positioning.

Clause 139. The wireless node of clause 138, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 140. The wireless node of any of clauses 138 to 139, further comprising: means for transmitting the one or more Tx reference signals for positioning.

Clause 141. The wireless node of any of clauses 138 to 140, wherein the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 142. The wireless node of any of clauses 121 to 141, wherein the first one or more reference signals include a receive (Rx) reference signal for positioning and a transmit (Tx) reference signal for positioning.

Clause 143. The wireless node of clause 142, further comprising: means for performing the first one or more measurements in association with the Rx reference signal for positioning and the Tx reference signal for positioning; and means for transmitting a measurement report based on the first one or more measurements.

Clause 144. The wireless node of any of clauses 142 to 143, wherein the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

Clause 145. The wireless node of any of clauses 121 to 144, wherein the wireless node corresponds to a user equipment (UE), further comprising: means for transmitting a measurement report associated with the first one or more reference signals.

Clause 146. The wireless node of clause 145, wherein the indication is integrated with the measurement report or separate from the measurement report.

Clause 147. The wireless node of any of clauses 121 to 146, wherein the indication is transmitted in a time-based or event-based manner.

Clause 148. The wireless node of any of clauses 121 to 147, wherein the first one or more reference signals for positioning comprise a first reference signal for positioning and a second reference signal for positioning associated with a differential positioning measurement, and wherein the transmitting transmits a first indication of a first timing group associated with the first reference signal for positioning and a second indication of a second timing group associated with the second reference signal for positioning.

Clause 149. The wireless node of any of clauses 121 to 148, wherein the plurality of timing groups is associated with a respective maximum timing offset that specifies a maximum timing offset to be assumed by a network component for each respective timing group.

Clause 150. The wireless node of clause 149, further comprising: means for updating the maximum timing offsets on a periodic basis, an event-triggered basis, or a combination thereof; and means for reporting the maximum timing offsets to the network component.

Clause 151. The wireless node of any of clauses 121 to 150, wherein the reporting further comprises reporting one or more timer validity tags that each indicates or is associated with a validity time for one or more parameters associated with the indication of the associated timing group.

Clause 152. A position estimation entity, comprising: means for receiving, from a first wireless node or a second wireless node, a first one or more measurements associated with a first one or more reference signals for positioning communicated between the first wireless node and the second wireless node; means for receiving, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and means for performing a positioning estimation procedure based at least in part upon the first one or more measurements and the first timing information associated with the associated timing group.

Clause 153. The position estimation entity of clause 152, wherein the first timing information is associated with a set of hardware components of the first wireless node.

Clause 154. The position estimation entity of any of clauses 152 to 153, further comprising: means for receiving, from the first wireless node, a second one or more measurements associated with a second one or more reference signals for positioning; and means for receiving, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

Clause 155. The position estimation entity of any of clauses 152 to 154, further comprising: means for receiving, from the first wireless node, a second one or more measurements associated with a second one or more reference signals for positioning; and means for receiving, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

Clause 156. The position estimation entity of any of clauses 152 to 155, wherein the positioning estimation procedure is performed with respect to a user equipment (UE) that corresponds to either the first wireless node or the second wireless node.

Clause 157. The position estimation entity of any of clauses 152 to 156, wherein the first timing information matches respective timing information of the associated timing group by corresponding to a particular transmit or receive hardware group delay, a particular timing error, a particular calibration error, or a combination thereof, or wherein the first timing information matches the respective timing information of the associated timing group by falling within a transmit or receive hardware group delay range, a timing error range, a timing calibration error range, or a combination thereof.

Clause 158. The position estimation entity of any of clauses 152 to 157, wherein the first one or more reference signals for positioning include one or more receive (Rx) reference signals for positioning received at the first wireless node.

Clause 159. The position estimation entity of clause 158, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 160. The position estimation entity of any of clauses 158 to 159, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 161. The position estimation entity of clause 160, wherein the first Rx reference signal for positioning is a quasi-colocation (QCL) source or target or a spatial relation reference for the second Rx reference signal for positioning.

Clause 162. The position estimation entity of any of clauses 158 to 161, wherein the first one or more measurements are received in a measurement report.

Clause 163. The position estimation entity of clause 162, wherein the first one or more measurements comprise one or more timing measurements.

Clause 164. The position estimation entity of clause 163, wherein the one or more timing measurements comprise a time of arrival (ToA) measurement, a received signal time difference (RSTD) measurement, or an receive-transmit (Rx-Tx) measurement.

Clause 165. The position estimation entity of any of clauses 162 to 164, wherein a respective indication of a respective timing group associated with each of the first one or more measurements is received.

Clause 166. The position estimation entity of any of clauses 162 to 165, wherein multiple measurements associated with the same receive beam index are also associated with the same timing group.

Clause 167. The position estimation entity of any of clauses 162 to 166, wherein a single-bit indication indicates whether all measurements in the measurement report are associated with the same timing group.

Clause 168. The position estimation entity of any of clauses 162 to 167, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 169. The position estimation entity of any of clauses 158 to 168, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 170. The position estimation entity of any of clauses 152 to 169, wherein the first one or more reference signals include one or more transmit (Tx) reference signals for positioning that are transmitted from the first wireless node.

Clause 171. The position estimation entity of clause 170, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 172. The position estimation entity of any of clauses 170 to 171, wherein the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 173. The position estimation entity of any of clauses 152 to 172, wherein the first one or more reference signals include a receive (Rx) reference signal for positioning and a transmit (Tx) reference signal for positioning.

Clause 174. The position estimation entity of clause 173, wherein the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

Clause 175. The position estimation entity of any of clauses 152 to 174, wherein the indication is integrated with a measurement report comprising the first one or more measurements or separate from the measurement report.

Clause 176. The position estimation entity of any of clauses 152 to 175, wherein the indication is received in a time-based or event-based manner.

Clause 177. The position estimation entity of any of clauses 152 to 176, wherein the first one or more reference signals for positioning comprise a first reference signal for positioning and a second reference signal for positioning associated with a differential positioning measurement, and wherein a first indication of a first timing group associated with the first reference signal for positioning is received and a second indication of a second timing group associated with the second reference signal for positioning is received.

Clause 178. The position estimation entity of any of clauses 152 to 177, wherein the plurality of timing groups is associated with a respective maximum timing offset that specifies a maximum timing offset to be assumed for positioning estimation by the position estimation entity for each respective timing group.

Clause 179. The position estimation entity of clause 178, wherein the at least one processor is further configured to receive a report that indicates an update to the maximum timing offsets on a periodic basis, an event-triggered basis, or a combination thereof.

Clause 180. The position estimation entity of clause 179, wherein the report further indicates one or more timer validity tags that each indicates or is associated with a validity time for one or more parameters associated with the indication of the associated timing group.

Clause 181. A non-transitory computer-readable medium storing computer-executable instructions that, when executed by a wireless node, cause the wireless node to: determine first timing information associated with a first one or more reference signals for positioning or with a first one or more measurements derived using the first one or more reference signals for positioning, the first timing information including a transmit or receive hardware group delay, timing error, timing calibration error, or a combination thereof; determine that the first one or more reference signals or the first one or more measurements are associated with one of a plurality of timing groups at least based on the first timing information; and transmit an indication of the associated timing group in association with the first one or more reference signals for positioning or with the first one or more measurements derived using the first one or more reference signals for positioning.

Clause 182. The non-transitory computer-readable medium of clause 181, wherein the first timing information is associated with a set of hardware components of the first wireless node.

Clause 183. The non-transitory computer-readable medium of any of clauses 181 to 182, further comprising computer-executable instructions that, when executed by the wireless node, cause the wireless node to: determine second timing information associated with a second one or more reference signals for positioning or with a second one or more measurements derived using the second one or more reference signals for positioning, the second timing information being different than the first timing information; and determine that the second one or more reference signals or the second one or more measurements are associated with the same timing group as the first one or more reference signals or the first one or more measurements based on the first timing information and the second timing information falling within a respective timing information range.

Clause 184. The non-transitory computer-readable medium of any of clauses 181 to 183, further comprising computer-executable instructions that, when executed by the wireless node, cause the wireless node to: determine second timing information associated with a second one or more reference signals for positioning or with a second one or more measurements derived using the second one or more reference signals for positioning, the second timing information being the same as the first timing information; and determine that the second one or more reference signals or the second one or more measurements are associated with the same timing group as the first one or more reference signals or the first one or more measurements based on the first timing information and the second timing information being the same.

Clause 185. The non-transitory computer-readable medium of any of clauses 181 to 184, wherein the first timing information matches respective timing information of the associated timing group by corresponding to a particular transmit or receive hardware group delay, a particular timing error, a particular timing calibration error, or a combination thereof, or wherein the first timing information matches the respective timing information of the associated timing group by falling within a transmit or receive hardware group delay range, a timing error range, a timing calibration error range, or a combination thereof.

Clause 186. The non-transitory computer-readable medium of any of clauses 181 to 185, wherein the first one or more reference signals for positioning include one or more receive (Rx) reference signals for positioning received at the wireless node.

Clause 187. The non-transitory computer-readable medium of clause 186, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 188. The non-transitory computer-readable medium of any of clauses 186 to 187, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 189. The non-transitory computer-readable medium of clause 188, wherein the first Rx reference signal for positioning is a quasi-colocation (QCL) source or target or a spatial relation reference for the second Rx reference signal for positioning.

Clause 190. The non-transitory computer-readable medium of any of clauses 186 to 189, further comprising computer-executable instructions that, when executed by the wireless node, cause the wireless node to: perform the first one or more measurements associated with the first one or more reference signals for positioning; and transmit a measurement report based on the first one or more measurements.

Clause 191. The non-transitory computer-readable medium of clause 190, wherein the first one or more measurements comprise one or more timing measurements.

Clause 192. The non-transitory computer-readable medium of clause 191, wherein the one or more timing measurements comprise a time of arrival (ToA) measurement, a received signal time difference (RSTD) measurement, or an receive-transmit (Rx-Tx) measurement.

Clause 193. The non-transitory computer-readable medium of any of clauses 190 to 192, wherein the indication of the associated timing group comprises a respective indication of a respective timing group associated with each measurement in the measurement report.

Clause 194. The non-transitory computer-readable medium of any of clauses 190 to 193, wherein multiple measurements associated with the same receive beam index are also associated with the same timing group.

Clause 195. The non-transitory computer-readable medium of any of clauses 190 to 194, wherein the measurement report comprises a single-bit indication that indicates whether all measurements in the measurement report are associated with the same timing group.

Clause 196. The non-transitory computer-readable medium of any of clauses 190 to 195, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 197. The non-transitory computer-readable medium of any of clauses 186 to 196, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 198. The non-transitory computer-readable medium of any of clauses 181 to 197, wherein the first one or more reference signals include one or more transmit (Tx) reference signals for positioning.

Clause 199. The non-transitory computer-readable medium of clause 198, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 200. The non-transitory computer-readable medium of any of clauses 198 to 199, further comprising computer-executable instructions that, when executed by the wireless node, cause the wireless node to: transmit the one or more Tx reference signals for positioning.

Clause 201. The non-transitory computer-readable medium of any of clauses 198 to 200, wherein the wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, an uplink demodulation reference signal (DMRS), or a combination thereof or wherein the wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 202. The non-transitory computer-readable medium of any of clauses 181 to 201, wherein the first one or more reference signals include a receive (Rx) reference signal for positioning and a transmit (Tx) reference signal for positioning.

Clause 203. The non-transitory computer-readable medium of clause 202, further comprising computer-executable instructions that, when executed by the wireless node, cause the wireless node to: perform the first one or more measurements in association with the Rx reference signal for positioning and the Tx reference signal for positioning; and transmit a measurement report based on the first one or more measurements.

Clause 204. The non-transitory computer-readable medium of any of clauses 202 to 203, wherein the wireless node corresponds to a user equipment (UE), and the Tx reference signal for positioning comprises a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, an uplink DMRS, or a combination thereof, or wherein the wireless node corresponds to a base station, and the Tx reference signal for positioning comprises the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the TRS, the CSI-RS, the PDSCH, the PSSCH, the downlink DMRS, or a combination thereof.

Clause 205. The non-transitory computer-readable medium of any of clauses 181 to 204, wherein the wireless node corresponds to a user equipment (UE), further comprising: transmit a measurement report associated with the first one or more reference signals.

Clause 206. The non-transitory computer-readable medium of clause 205, wherein the indication is integrated with the measurement report or separate from the measurement report.

Clause 207. The non-transitory computer-readable medium of any of clauses 181 to 206, wherein the indication is transmitted in a time-based or event-based manner.

Clause 208. The non-transitory computer-readable medium of any of clauses 181 to 207, wherein the first one or more reference signals for positioning comprise a first reference signal for positioning and a second reference signal for positioning associated with a differential positioning measurement, and wherein the transmitting transmits a first indication of a first timing group associated with the first reference signal for positioning and a second indication of a second timing group associated with the second reference signal for positioning.

Clause 209. The non-transitory computer-readable medium of any of clauses 181 to 208, wherein the plurality of timing groups is associated with a respective maximum timing offset that specifies a maximum timing offset to be assumed by a network component for each respective timing group.

Clause 210. The non-transitory computer-readable medium of clause 209, further comprising computer-executable instructions that, when executed by the wireless node, cause the wireless node to: update the maximum timing offsets on a periodic basis, an event-triggered basis, or a combination thereof; and report the maximum timing offsets to the network component.

Clause 211. The non-transitory computer-readable medium of any of clauses 181 to 210, wherein the reporting further comprises reporting one or more timer validity tags that each indicates or is associated with a validity time for one or more parameters associated with the indication of the associated timing group.

Clause 212. A non-transitory computer-readable medium storing computer-executable instructions that, when executed by a position estimation entity, cause the position estimation entity to: receive, from a first wireless node or a second wireless node, a first one or more measurements associated with a first one or more reference signals for positioning communicated between the first wireless node and the second wireless node; receive, from the first wireless node, an indication that the first one or more reference signals for positioning or the first one or more measurements are associated with one of a plurality of timing groups, the associated timing group associated with first timing information that includes a transmit or receive hardware group delay, timing error, timing calibration error, or a combination thereof; and perform a positioning estimation procedure based at least in part upon the first one or more measurements and the first timing information associated with the associated timing group.

Clause 213. The non-transitory computer-readable medium of clause 212, wherein the first timing information is associated with a set of hardware components of the first wireless node.

Clause 214. The non-transitory computer-readable medium of any of clauses 212 to 213, further comprising computer-executable instructions that, when executed by the position estimation entity, cause the position estimation entity to: receive, from the first wireless node, a second one or more measurements associated with a second one or more reference signals for positioning; and receive, from the first wireless node, a second indication that the second one or more reference signals for positioning or the second one or more measurements are associated with the same timing group as the first one or more reference signals or the first one or more measurements based on second timing information associated with the second one or more reference signals for positioning or the second one or more measurements being the same as the first timing information.

Clause 215. The non-transitory computer-readable medium of any of clauses 212 to 214, further comprising computer-executable instructions that, when executed by the position estimation entity, cause the position estimation entity to: receive, from the first wireless node, a second one or more measurements associated with a second one or more reference signals for positioning; and receive, from the first wireless node, a second indication that the second one or more reference signals for positioning or the second one or more measurements are associated with the same timing group as the first one or more reference signals or the first one or more measurements based on the first timing information and second timing information associated with the second one or more reference signals for positioning or the second one or more measurements falling within at least one respective timing information range.

Clause 216. The non-transitory computer-readable medium of any of clauses 212 to 215, wherein the positioning estimation procedure is performed with respect to a user equipment (UE) that corresponds to either the first wireless node or the second wireless node.

Clause 217. The non-transitory computer-readable medium of any of clauses 212 to 216, wherein the first timing information matches respective timing information of the associated timing group by corresponding to a particular transmit or receive hardware group delay, a particular timing error, a particular calibration error, or a combination thereof, or wherein the first timing information matches the respective timing information of the associated timing group by falling within a transmit or receive hardware group delay range, a timing error range, a timing calibration error range, or a combination thereof.

Clause 218. The non-transitory computer-readable medium of any of clauses 212 to 217, wherein the first one or more reference signals for positioning include one or more receive (Rx) reference signals for positioning received at the first wireless node.

Clause 219. The non-transitory computer-readable medium of clause 218, wherein the one or more Rx reference signals for positioning comprise a first Rx reference signal for positioning and a second Rx reference signal for positioning associated with the same timing group based on the first Rx reference signal for positioning being a quasi-colocation (QCL) source or target or spatial relation reference for the second Rx reference signal for positioning.

Clause 220. The non-transitory computer-readable medium of any of clauses 218 to 219, wherein the one or more Rx reference signals for positioning comprise a first Rx reference signal for positioning and a second Rx reference signal for positioning, configured in different frequency layers or different bands or different Frequency Ranges (FRs) are associated with the same timing group.

Clause 221. The non-transitory computer-readable medium of clause 220, wherein the first Rx reference signal for positioning is a quasi-colocation (QCL) source or target or a spatial relation reference for the second Rx reference signal for positioning.

Clause 222. The non-transitory computer-readable medium of any of clauses 218 to 221, wherein the first one or more measurements are received in a measurement report.

Clause 223. The non-transitory computer-readable medium of clause 222, wherein the first one or more measurements comprise one or more timing measurements.

Clause 224. The non-transitory computer-readable medium of clause 223, wherein the one or more timing measurements comprise a time of arrival (ToA) measurement, a received signal time difference (RSTD) measurement, or an receive-transmit (Rx-Tx) measurement.

Clause 225. The non-transitory computer-readable medium of any of clauses 222 to 224, wherein a respective indication of a respective timing group associated with each of the first one or more measurements is received.

Clause 226. The non-transitory computer-readable medium of any of clauses 222 to 225, wherein multiple measurements associated with the same receive beam index are also associated with the same timing group.

Clause 227. The non-transitory computer-readable medium of any of clauses 222 to 226, wherein a single-bit indication indicates whether all measurements in the measurement report are associated with the same timing group.

Clause 228. The non-transitory computer-readable medium of any of clauses 222 to 227, wherein the first one or more measurements comprise a first measurement associated with a first path of a respective Rx reference signal for positioning and a second measurement associated with a second path of the respective Rx reference signal for positioning, wherein the first measurement and the second measurement are associated with the same timing group based on the first measurement and the second measurement being associated with different paths of the same respective Rx reference signal for positioning.

Clause 229. The non-transitory computer-readable medium of any of clauses 218 to 228, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a base station and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

Clause 230. The non-transitory computer-readable medium of any of clauses 212 to 229, wherein the first one or more reference signals include one or more transmit (Tx) reference signals for positioning that are transmitted from the first wireless node.

Clause 231. The non-transitory computer-readable medium of clause 230, wherein the one or more Tx reference signals for positioning comprise a first Tx reference signal for positioning and a second Tx reference signal for positioning associated with the same timing group based on the first Tx reference signal for positioning being a quasi-colocation (QCL) source or target or spatial relation reference for the second Tx reference signal for positioning.

Clause 232. The non-transitory computer-readable medium of any of clauses 230 to 231, wherein the first wireless node corresponds to a user equipment (UE) and the one or more Tx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink demodulation reference signal (DMRS), or a combination thereof or wherein the first wireless node corresponds to a base station and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink DMRS, or a combination thereof.

Clause 233. The non-transitory computer-readable medium of any of clauses 212 to 232, wherein the first one or more reference signals include a receive (Rx) reference signal for positioning and a transmit (Tx) reference signal for positioning.

Clause 234. The non-transitory computer-readable medium of clause 233, wherein the first wireless node corresponds to a user equipment (UE), and the one or more Tx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, and the Tx reference signal for positioning corresponds to an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof, or wherein the first wireless node corresponds to a base station, and the one or more Tx reference signals for positioning comprise the UL-SRS-P, the UL-SRS for MIMO, the PRACH signal, the PUSCH communication, or the uplink DMRS, or a combination thereof, and the Tx reference signal for positioning corresponds to the DL-PRS, the SSB, the PSS, the SSS, the PBCH, the TRS, the CSI-RS, the PDSCH, the PSSCH, the downlink DMRS, or a combination thereof.

Clause 235. The non-transitory computer-readable medium of any of clauses 212 to 234, wherein the indication is integrated with a measurement report comprising the first one or more measurements or separate from the measurement report.

Clause 236. The non-transitory computer-readable medium of any of clauses 212 to 235, wherein the indication is received in a time-based or event-based manner.

Clause 237. The non-transitory computer-readable medium of any of clauses 212 to 236, wherein the first one or more reference signals for positioning comprise a first reference signal for positioning and a second reference signal for positioning associated with a differential positioning measurement, and wherein a first indication of a first timing group associated with the first reference signal for positioning is received and a second indication of a second timing group associated with the second reference signal for positioning is received.

Clause 238. The non-transitory computer-readable medium of any of clauses 212 to 237, wherein the plurality of timing groups is associated with a respective maximum timing offset that specifies a maximum timing offset to be assumed for positioning estimation by the position estimation entity for each respective timing group.

Clause 239. The non-transitory computer-readable medium of clause 238, further comprising computer-executable instructions that, when executed by the position estimation entity, cause the position estimation entity to: receive a report that indicates an update to the maximum timing offsets on a periodic basis, an event-triggered basis, or a combination thereof.

Clause 240. The non-transitory computer-readable medium of clause 239, wherein the report further indicates one or more timer validity tags that each indicates or is associated with a validity time for one or more parameters associated with the indication of the associated timing group.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a wireless node, comprising:

determining first timing information associated with a first one or more reference signals for positioning or with a first one or more measurements associated with the first one or more reference signals for positioning, the first timing information including a transmit or receive hardware group delay, timing error, timing calibration error, or a combination thereof;

determining that the first one or more reference signals or the first one or more measurements are associated with one of a plurality of timing groups at least based on the first timing information;

performing the first one or more measurements associated with the first one or more reference signals for positioning;

transmitting an indication of the associated timing group; and transmitting a measurement report based on the first one or more measurements, wherein the indication of the associated timing group comprises a respective indication of a respective timing group associated with each measurement in the measurement report, wherein the first one or more reference signals for positioning include one or more receive (Rx) reference signals for positioning received at the wireless node, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a network component and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

2. The method of claim 1, further comprising:

determining second timing information associated with a second one or more reference signals for positioning or with a second one or more measurements associated with the second one or more reference signals for positioning, the second timing information being different than the first timing information; and determining that the second one or more reference signals or the second one or more measurements are associated with the same timing group as the first one or more reference signals or the first one or more measurements based on the first timing information and the second timing information falling within a respective timing information range.

3. The method of claim 1, wherein the one or more Rx reference signals for positioning comprise a first Rx reference signal for positioning and a second Rx reference signal for positioning, configured in different frequency layers or different bands or different Frequency Ranges (FRs) are associated with the same timing group.

4. The method of claim 1, wherein the first one or more measurements comprise one or more timing measurements.

5. The method of claim 4, wherein the one or more timing measurements comprise a time of arrival (ToA) measurement, a received signal time difference (RSTD) measurement, or an receive-transmit (Rx-Tx) measurement.

6. The method of claim 1, wherein the first one or more reference signals include the one or more Rx reference signals for positioning and a transmit (Tx) reference signal for positioning.

7. The method of claim 6, wherein the first one or more measurements are performed in association with the one or more Rx reference signals for positioning and the Tx reference signal for positioning.

8. The method of claim 1, wherein the wireless node corresponds to the UE.

9. The method of claim 1, wherein the indication is integrated with the measurement report.

10. The method of claim 1, wherein the first one or more reference signals for positioning comprise a first reference signal for positioning and a second reference signal for positioning associated with a differential positioning measurement, and wherein the transmitting of the indication transmits a first indication of a first timing group associated with the first reference signal for positioning and a second indication of a second timing group associated with the second reference signal for positioning.

11. The method of claim 1, wherein the plurality of timing groups is associated with a respective maximum timing offset that specifies a maximum timing offset for each respective timing group.

12. A wireless node, comprising:

a memory;

at least one transceiver; and at least one processor communicatively coupled to the memory and the at least one transceiver, the at least one processor configured to:

determine first timing information associated with a first one or more reference signals for positioning or with a first one or more measurements associated with the first one or more reference signals for positioning, the first timing information including a transmit or receive hardware group delay, timing error, timing calibration error, or a combination thereof;

determine that the first one or more reference signals or the first one or more measurements are associated with one of a plurality of timing groups at least based on the first timing information;

perform the first one or more measurements associated with the first one or more reference signals for positioning;

transmit, via the at least one transceiver, an indication of the associated timing group; and transmit, via the at least one transceiver, a measurement report based on the first one or more measurements, wherein the indication of the associated timing group comprises a respective indication of a respective timing group associated with each measurement in the measurement report, wherein the first one or more reference signals for positioning include one or more receive (Rx) reference signals for positioning received at the wireless node, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal (TRS), a channel state information reference signal (CSI-RS), physical dedicated shared channel (PDSCH), a physical sidelink shared channel (PSSCH), or a downlink demodulation reference signal (DMRS), or a combination thereof, or wherein the wireless node corresponds to a network component and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

13. The wireless node of claim 12, wherein the at least one processor is further configured to:

determine second timing information associated with a second one or more reference signals for positioning or with a second one or more measurements associated with the second one or more reference signals for positioning, the second timing information being different than the first timing information; and determine that the second one or more reference signals or the second one or more measurements are associated with the same timing group as the first one or more reference signals or the first one or more measurements based on the first timing information and the second timing information falling within a respective timing information range.

14. The wireless node of claim 12, wherein the one or more Rx reference signals for positioning comprise a first Rx reference signal for positioning and a second Rx reference signal for positioning, configured in different frequency layers or different bands or different Frequency Ranges (FRs) are associated with the same timing group.

15. The wireless node of claim 12, wherein the first one or more measurements comprise one or more timing measurements.

16. The wireless node of claim 15, wherein the one or more timing measurements comprise a time of arrival (ToA) measurement, a received signal time difference (RSTD) measurement, or an receive-transmit (Rx-Tx) measurement.

17. The wireless node of claim 12, wherein the first one or more reference signals include the one or more Rx reference signals for positioning and a transmit (Tx) reference signal for positioning.

18. The wireless node of claim 17, wherein the first one or more measurements are performed in association with the one or more Rx reference signals for positioning and the Tx reference signal for positioning.

19. The wireless node of claim 12, wherein the wireless node corresponds to the UE.

20. The wireless node of claim 12, wherein the indication is integrated with the measurement report.

21. The wireless node of claim 12, wherein the first one or more reference signals for positioning comprise a first reference signal for positioning and a second reference signal for positioning associated with a differential positioning measurement, and wherein the transmission of the indication transmits a first indication of a first timing group associated with the first reference signal for positioning and a second indication of a second timing group associated with the second reference signal for positioning.

22. The wireless node of claim 12, wherein the plurality of timing groups is associated with a respective maximum timing offset that specifies a maximum timing offset for each respective timing group.

23. A wireless node, comprising:

means for determining first timing information associated with a first one or more reference signals for positioning or with a first one or more measurements associated with the first one or more reference signals for positioning, the first timing information including a transmit or receive hardware group delay, timing error, timing calibration error, or a combination thereof;

means for determining that the first one or more reference signals or the first one or more measurements are associated with one of a plurality of timing groups at least based on the first timing information;

means for performing the first one or more measurements associated with the first one or more reference signals for positioning;

means for transmitting an indication of the associated timing group; and transmitting a measurement report based on the first one or more measurements, wherein the indication of the associated timing group comprises a respective indication of a respective timing group associated with each measurement in the measurement report, wherein the first one or more reference signals for positioning include one or more receive (Rx) reference signals for positioning received at the wireless node, wherein the wireless node corresponds to a user equipment (UE) and the one or more Rx reference signals for positioning comprise a downlink positioning reference signal (DL-PRS), a synchronization signal block (SSB), a primary synchronization signal (PSS), a secondary synchronization signal (SSS), a physical broadcast channel (PBCH), a tracking reference signal TRS), a channel state information reference signal (CSI-RS), physical dedicated shared channel PDSCH), a physical sidelink shared channel (PSSCH), or a downlink demodulation reference signal (DMRS), or a combination thereof, or wherein the wireless node corresponds to a network component and the one or more Rx reference signals for positioning comprise an uplink sounding reference signal for positioning (UL-SRS-P), an UL-SRS for multiple input multiple output (MIMO), a physical random access channel (PRACH) signal, a physical uplink shared channel (PUSCH) communication, or an uplink DMRS, or a combination thereof.

24. The method of claim 1, wherein the wireless node corresponds to the UE, and the one or more Rx reference signals for positioning comprise the DL-PRS.

25. The wireless node of claim 12, wherein the wireless node corresponds to the UE, and the one or more Rx reference signals for positioning comprise the DL-PRS.

26. The wireless node of claim 23, wherein the wireless node corresponds to the UE, and the one or more Rx reference signals for positioning comprise the DL-PRS.

* * * * *